(12) United States Patent
Perlman

(10) Patent No.: US 6,530,085 B1
(45) Date of Patent: Mar. 4, 2003

(54) CONFIGURATION FOR ENHANCED ENTERTAINMENT SYSTEM CONTROL

(75) Inventor: Stephen G. Perlman, Mountain View, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/154,609

(22) Filed: Sep. 16, 1998

(51) Int. Cl.⁷ ................................................ H04N 7/18
(52) U.S. Cl. ............................. 725/82; 725/80; 439/502
(58) Field of Search ........................... 725/82, 85, 80; 439/638, 653, 639, 502, 955

(56) References Cited

U.S. PATENT DOCUMENTS

| | | | |
|---|---|---|---|
| 5,548,338 A | 8/1996 | Ellis et al. | 348/473 |
| 5,572,263 A | 11/1996 | Kim et al. | 348/705 |
| 5,579,055 A | 11/1996 | Hamilton et al. | 348/476 |
| 5,585,837 A | 12/1996 | Nixon | 348/6 |
| 5,619,247 A | 4/1997 | Russo | 348/3 |
| 5,640,453 A | 6/1997 | Schuchman et al. | 380/10 |
| 5,835,126 A | 11/1998 | Lewis | 348/8 |
| 5,867,223 A | 2/1999 | Schindler et al. | 348/552 |
| 5,880,768 A | 3/1999 | Lemmons et al. | 348/1 |
| 5,886,732 A | 3/1999 | Humpleman | 348/10 |
| 6,126,463 A * | 10/2000 | Okazaki | 439/188 |
| 6,178,514 B1 * | 1/2001 | Wood | 713/300 |
| 6,259,443 B1 * | 7/2001 | Williams | 345/329 |
| 6,268,849 B1 * | 7/2001 | Boyer et al. | 345/327 |
| 6,314,479 B1 * | 11/2001 | Frederick et al. | 710/63 |

FOREIGN PATENT DOCUMENTS

JP          58158257       *  9/1983 .................. 400/82

* cited by examiner

Primary Examiner—Andrew Faile
Assistant Examiner—Andrew Y Koenig
(74) Attorney, Agent, or Firm—Workman, Nydegger & Seeley

(57) ABSTRACT

Systems and methods that reduce the complexity of interconnecting various consumer electronics devices. One consumer electronics device, such as an Internet terminal, forms a central hub to which all other consumer electronics devices are connected. The Internet terminal has a plurality of identical, interchangeable tongue and groove connectors, each having a plurality of pins. The connectors are identical and interchangeable in that a cable designed to connect a consumer electronics device to the Internet terminal may be plugged into any of the connectors and operate properly. A plurality of cables, each specifically adapted to connect to an existing or future type of consumer electronics device, are used to connect the consumer electronics devices to the connectors at the Internet terminal. Each cable has a connector at one end that attaches to the identical, interchangeable connectors, and one or more connectors at the other end that attach to the particular consumer electronics device. The Internet terminal senses the type of cable attached thereto and performs any appropriate configuration of the connector pins in order to match the signals provided or received from the connector to the particular cable.

42 Claims, 17 Drawing Sheets

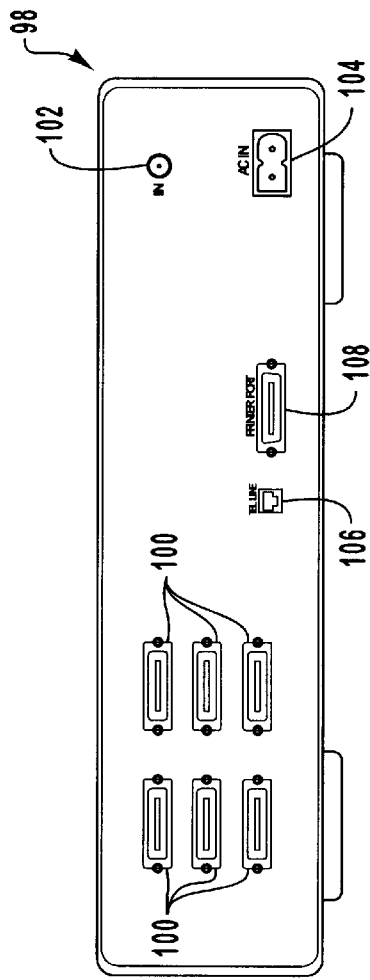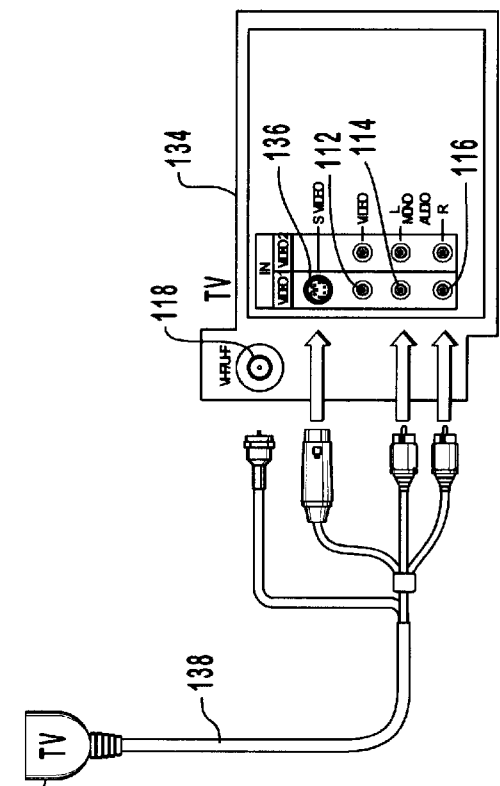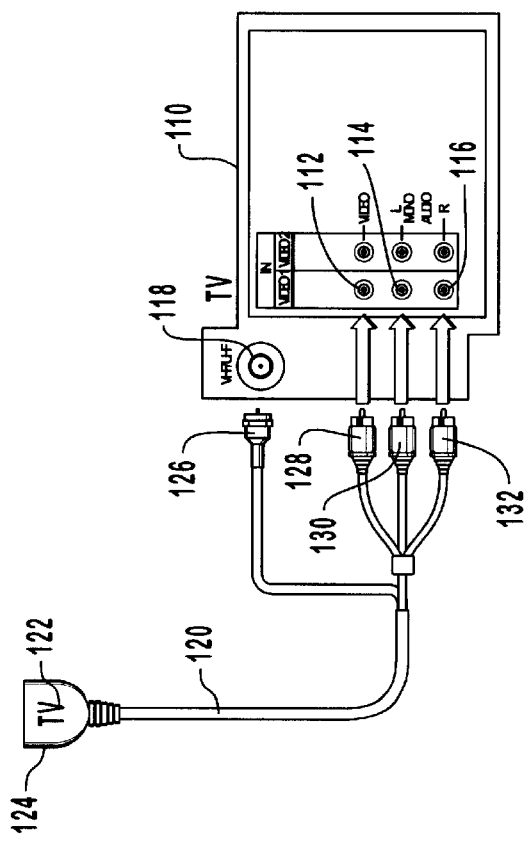
FIG. 7
FIG. 8a
FIG. 8b

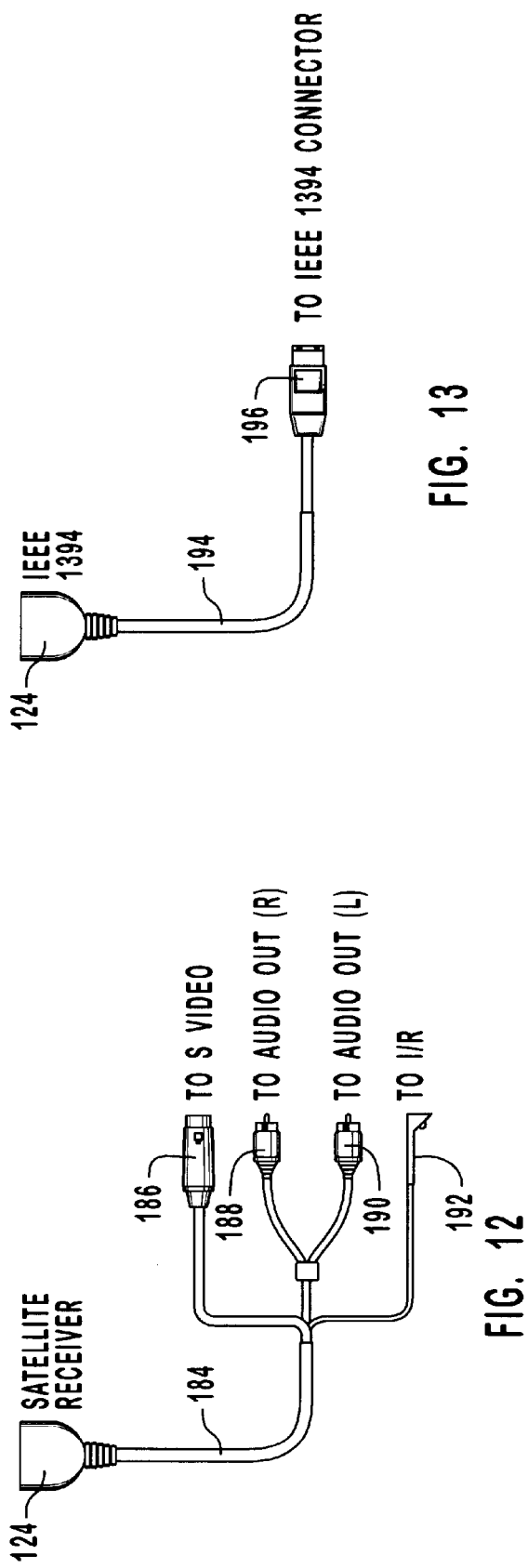

CONFIGURATION FOR ENHANCED ENTERTAINMENT SYSTEM CONTROL

BACKGROUND OF THE INVENTION

1. The Field of the Invention

The present invention relates to systems and methods for interconnecting a plurality of consumer electronics devices. More specifically, the present invention is directed to systems and methods that allow interconnection of a television set or other display device and various consumer electronics devices such as VCRs, video disk players, satellite receivers, cable boxes, video game players, and Internet terminal devices.

2. The Prior State of the Art

Since its introduction, the television has provided a source of entertainment for millions of individuals. The television has traditionally been a fairly simple device that is easy for users to set up and connect. Traditionally, a user simply unboxed the television, connected the antenna, plugged the television in and turned it on.

Today, however, televisions have moved well beyond their traditional configurations and may form the center of a wide array of entertainment and information systems. For example, various consumer electronics devices, such as VCRs, video disk players, video game devices, and so forth, may be connected to a television to provide enhanced entertainment opportunities. In addition, recently there have been introduced a variety of inexpensive Internet terminal boxes which allow individuals to connect to the Internet to send and receive information. These Internet terminals use a television set as the display device. Furthermore, video programming may be received not only from traditional broadcast antennas, but also cable television services and satellite receivers. In order to give a high quality viewing experience, home theater systems that provide surround sound and near theater quality audio can also be connected.

Although consumers are now able to custom configure a wide variety of home entertainment and information systems using the various consumer electronic choices available today, connecting the devices together in order to realize the full benefit of the consumer electronic devices can be extremely difficult. In fact, various configurations can be so complicated, that users refuse to consider the purchase of additional consumer electronics devices simply because they cannot figure out how to connect them together. In order to provide high quality video and audio, the mechanisms for connecting these various consumer electronics devices to a television may vary dramatically from device to device. Connections may include not only coaxial cable, but also a variety of RCA-type connectors for audio and/or video, S-video connectors, and so forth. If the various video and audio standards of foreign countries are taken into account, the various configurations and connectors is extremely vast.

In order to help illustrate the magnitude of the problem, reference will now be made to FIGS. 1–6 which show various potential configurations for how an Internet terminal, such as those that are commonly available today, may be connected to a television. Referring first to FIG. 1, the most basic configuration is illustrated. In FIG. 1, a low-cost Internet terminal is illustrated generally as 20. Such Internet terminals are typically specialized low-cost computer devices designed specifically to connect to the Internet and allow browsing and delivery of information from the Internet to the television screen. Such computers include the NC, licensed by Network Computer, Inc., the Sega Saturn (combined with the netlink accessory), by Sega Corporation, and the WebTV, by WebTV Networks, Inc. As illustrated in FIG. 1, such Internet terminals may have a plurality of various connectors on the back of the device that allow the device to be connected to the television and to the various other consumer electronics devices a user might have. In FIG. 1, such connectors are illustrated generally as 22.

In the most basic configuration, an Internet terminal is connected to the television without any other consumer electronics devices via traditional coaxial cable. In this configuration, illustrated in FIG. 1, coaxial cable 24 coming from an antenna or cable box is connected to an input connector 26. A second coaxial cable 28 is connected between Internet terminal 20 and television 30 as illustrated in FIG. 1. Additionally, power cord 32 and telephone cable 34 are connected to their respective connectors. Such a configuration would be used, for example, with an older style television which only had a VHF/UHF connector 36 as indicated.

In order to improve the video quality of information flowing from a consumer electronics device to a television, many newer televisions have direct audio and video inputs. Such a television is illustrated, for example, in FIG. 2. As illustrated in FIG. 2, Television 38 has not only VHF/UHF connector 36 but also a direct video input 40 and a direct audio input 42. Such connectors are usually configured to receive a standard RCA type connector. As indicated in FIG. 2, a standard RCA cable 44 is connected to video input 40, audio input 42 and corresponding video output 46 and audio output 48 on the Internet terminal. Since the television is configured only to accept mono audio signals, the second stereo audio output is not utilized.

Turning next to FIG. 3, yet a different type of television having different connectors is illustrated. In this figure, television 50 has not only video inputs 40 but also S-video input 52 and stereo audio inputs 54 and 56. S-video is yet another standard that has been developed in order to provide crisper, higher quality video signals to televisions. Thus, it is desirable to use S-video whenever possible. In FIG. 3, therefore, rather than using video input 40, S-video cable 58 is connected between S-video input 52 and S-video output 60 of Internet terminal 20. Left channel audio input 54 is then connected to left channel audio output connector 48 of Internet terminal 20, and right channel audio input 56 is connected to right channel audio output 62 of Internet terminal 20 in order to provide stereo sound between Internet terminal 20 and television 50. If, for some reason, the user did not desire to use the S-video input, then television 50 may be connected to Internet terminal 20 as illustrated in FIG. 4 by using RCA cable 44 to connect video output 46 to video input 40.

FIGS. 1–4 illustrate the complexity that can occur when connecting a consumer electronics device to a television. These situations illustrate only a single consumer electronic device, represented by Internet terminal 20. Such a consumer electronics device is, however, simply representative since identical events happen whenever any type of consumer electronics device is connected to a television. When multiple consumer electronics devices are connected to a television, the situation becomes even more confusing. One such configuration is illustrated in FIG. 5 where the video programming is provided by a cable television service. The consumer also has both an Internet terminal and a VCR that he desires to connect to a television. Given these choices, FIG. 5 represents one possible configuration that a user might be required to connect.

In FIG. 5, video programming is delivered to the user through coaxial cable 24. When video programming is delivered from a cable television service, usually some, and occasionally all, of the channels are scrambled or otherwise encoded to discourage piracy. Cable television services thus, typically require a user to have a cable box 64 to decode these channels. Coaxial cable 24 is therefore connected to input connector 66. Output connector 68 is typically connected via coaxial cable 70 to the input connector 72 of VCR 74. Output connector 76 of VCR 74 is connected via coaxial cable 78 to input connector 26 of Internet terminal 20. Output connector 35 of Internet terminal 20 is connected via coaxial cable 28 to input connector 36 of television 50 as previously described. Internet terminal 20 is also connected to television 50 via RCA cable 44 as previously described in conjunction with FIG. 4. As far as the video connection goes, a user could, alternatively, connect S-video connector 60 to S-video connector 52 with an S-video cable as previously described in conjunction with FIG. 3. VCR 74 is also connected to television 50 via RCA cable 80. RCA cable 80 thus connects video output 88 of VCR 74 to video input 82, left channel audio output 90 to left channel audio input 84 and right channel audio output 92 to right channel audio input 86.

In order to allow a user to change channels and control the various devices by remote control, Internet terminal 20 may incorporate a mechanism that prevents a user from having to use a separate remote control for each consumer electronics device. For example, Internet terminal 20 may be a WebTV Plus set-top box, which provides an IR blaster (an infrared emitter) that can be used to deliver infrared information from Internet terminal 20 to various consumer electronics devices. This allows a user, for example, to change channels using the remote control for Internet terminal 20, which will then relay the command to the appropriate device, such as cable box 64 or VCR 74 by transmitting appropriate infrared signals through IR blaster 94. This capability requires a user to connect IR cable 94 and place the other end of the cable in a location where the cable can deliver infrared information to the infrared receivers of cable box 64 and VCR 74, as illustrated in FIG. 6. As illustrated in FIG. 6, IR blaster cable 94 has an emitter assembly 96 which may be positioned on cable box 64 such that the infrared receiver of cable box 64 can receive the signals emitted from emitter assembly 96. In the example shown in FIG. 5, IR blaster 94 has two IR emitter assemblies. Although both emit IR simultaneously, the VCR 72 and cable box 64 normally will only respond to IR signaling encoded for each device.

The configuration of FIG. 5 represents just some of the complexity that can occur when a user desires to connect multiple consumer electronics devices to a television. A couple of observations should be made about the configuration illustrated in FIG. 5. As illustrated in FIG. 5, cable box 64 is connected to VCR 74 which is connected to Internet terminal 20 which is connected to television 50. In addition, another connection exists between VCR 74 and television 50. Such a configuration allows, for example, a user to record one channel on VCR 74 while, simultaneously, watching a different channel on television 50. However, it can be seen that should other consumer electronics devices wish to be placed in the chain, cabling modifications will have to be made. Not all configurations will allow a user to record video information from one source on a VCR while watching video information from another source. The various configurations can get extremely complicated and it is easy to see while many users cannot figure out how to make connections that allow full use of all features of the consumer electronics devices.

It would, therefore, be an advancement in the art to dramatically simplify the method of connecting various consumer electronics devices to a television. It would also be an advancement in the art to provide a simplified connection mechanism which virtually any user could follow and which allowed users to take full advantage of all capabilities of their various consumer electronics devices, independent of the number or type of consumer electronics devices connected to the television. It would also be an advancement in the art to reduce the overall cost of manufacturing consumer electronics devices using such an interconnection scheme.

SUMMARY AND OBJECTS OF THE INVENTION

The problems in the prior states of the art have been successfully overcome by the present invention which is directed to systems and methods for interconnecting a plurality of consumer electronics devices using a simplified cabling and connector system. The system allows users to quickly and easily interconnect any number of consumer electronics devices. The present invention provides the ability for users to interconnect their consumer electronics devices in such a way that the full capability of all consumer electronics devices may be realized without regard to the number or type of consumer electronics devices that are connected together.

According to the present invention, a consumer electronics device is provided with a plurality of identical, interchangeable connectors on the consumer electronics device. The connectors are identical in that each connector is of the same type and has the same number of connector pins. The connectors are interchangeable in that any cable may be plugged into any connector and function properly. This eliminates errors that often occur when users connect the wrong cable to the wrong connector. All such cabling mismatches are totally eliminated by the present invention.

In order to connect the consumer electronics device with the plurality of connectors to other consumer electronics devices, a plurality of cables are provided, each specifically adapted to connect to a particular consumer electronics device. For example, if a user has a television with only a VHF/UHF coaxial connector, then the user would select a cable that had on one end a connector designed and clearly labeled to connect to the VHF/UHF connector. The other end of the cable would terminate in a connector designed to attach to any one of the plurality of identical, interchangeable connectors. The user would thus take the cable, plug it into any open connector and connect the other end to the appropriate connector on the television.

When a cable is attached to one of the plurality of identical, interchangeable connectors on the consumer electronics device, the consumer electronics device senses the particular type of cable that has been attached. The consumer electronics device may then configure the pins of the connector to transmit or receive the signals that are appropriate to the cable. Thus, when the user connects the cable to the television or other consumer electronics device, the cable is properly configured.

The same mechanism may be used to connect the consumer electronics device to other consumer electronics devices. The consumer electronics device thus acts like a central hub with individual cables running to each of the other consumer electronics devices. If a user desires to add or remove a particular consumer electronics device from his configuration, it is a simple matter to either plug in a new cable or remove a cable from the device. No other cabling changes need be made. This is a dramatic improvement over the prior art where if a device is added or removed, often dramatic changes in the cabling structure need be made.

Because the consumer electronics device having the plurality of identical, interchangeable connectors forms a kind of hub in the consumer electronics system, the device may be used for routing the appropriate signals from an appropriate device to another appropriate device. Thus, it becomes a relatively easy task to route video signals from one source to a first destination, as for example a VCR, while, simultaneously, routing a second video source to a second destination, as for example the television. Thus, the architecture may be sufficient for a user to record video information from any source while, simultaneously, watching video information from any other source.

Objects of the present invention, therefore, include providing a simplified cabling mechanism which allows users to quickly and easily interconnect any number of consumer electronics devices, providing a system and method for interconnecting consumer electronic devices which allows consumer electronics devices to be easily added or removed from the configuration, and providing a system and method for interconnecting consumer electronics devices that virtually eliminates interconnection errors.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 7 represents an Internet terminal or other consumer electronics device with connectors according to the present invention;

FIGS. 8A and 8B illustrate various cables adapted to connect to various types of televisions;

FIG. 12 represents a cable to connect to a satellite receiver;

FIG. 13 represents a cable to connect to a device having an IEEE 1394 connector;

DETAILED DESCRIPTION OF THE PREFERRED EMBODIMENTS

Figure 1:
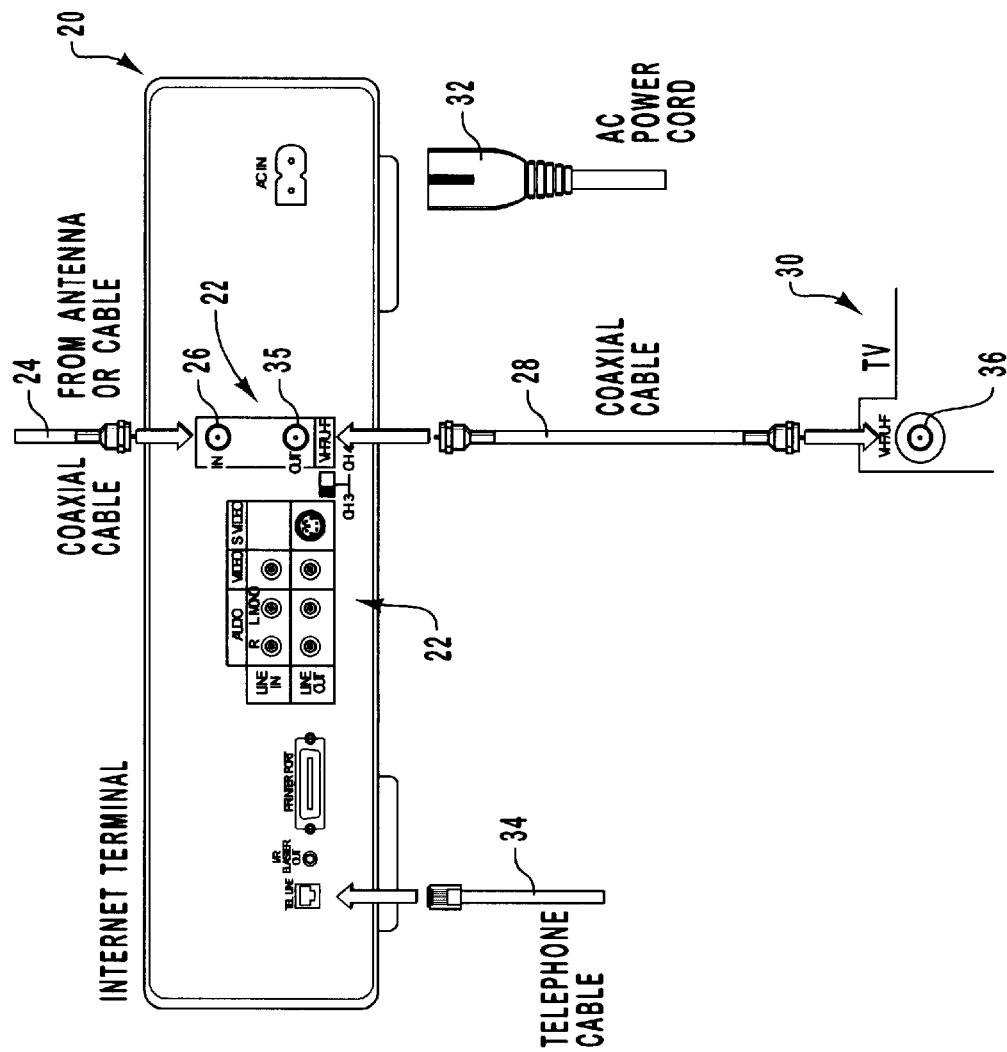
FIG. 1 is a basic configuration connecting an Internet terminal to a television.
Figure 2:
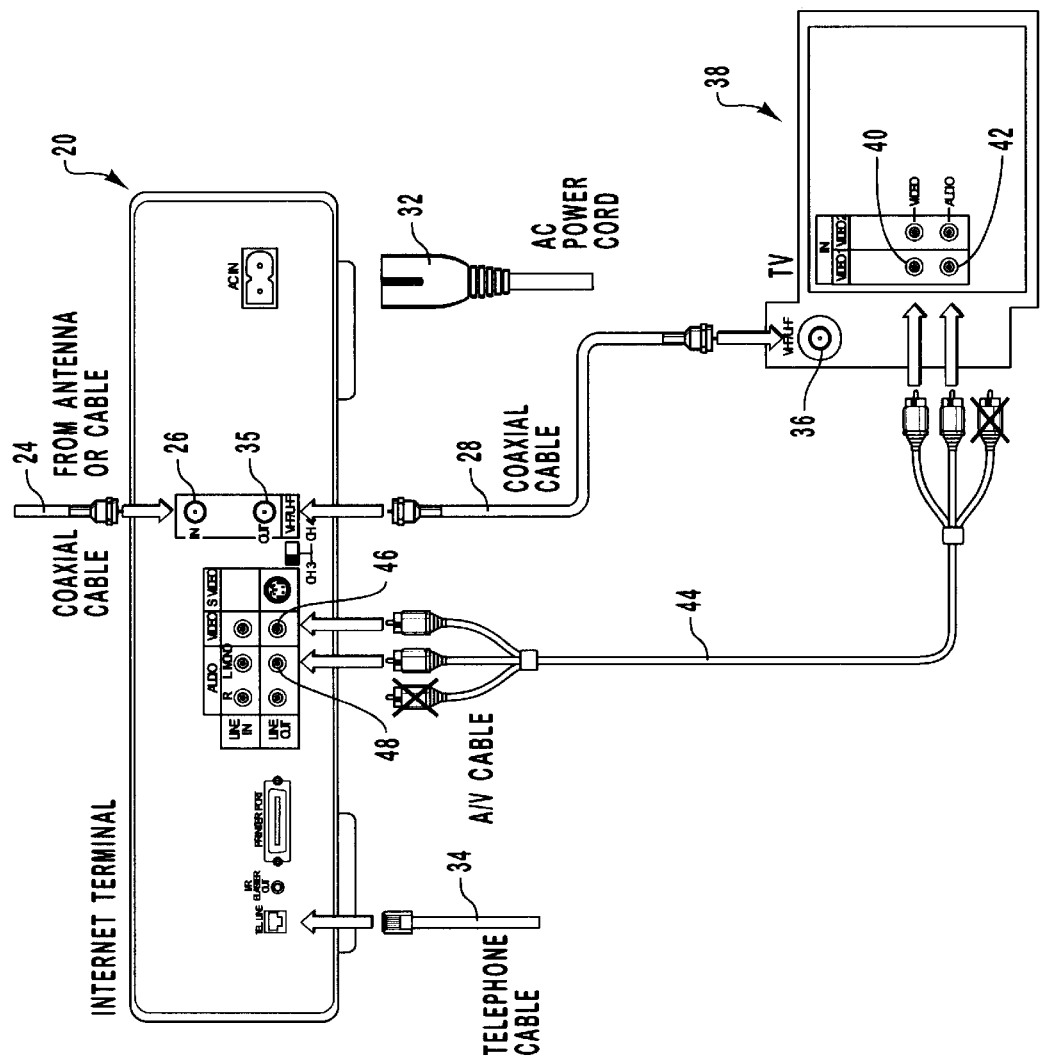
FIG. 2 is another configuration connecting an Internet terminal to a television having line video and audio inputs.
Figure 3:
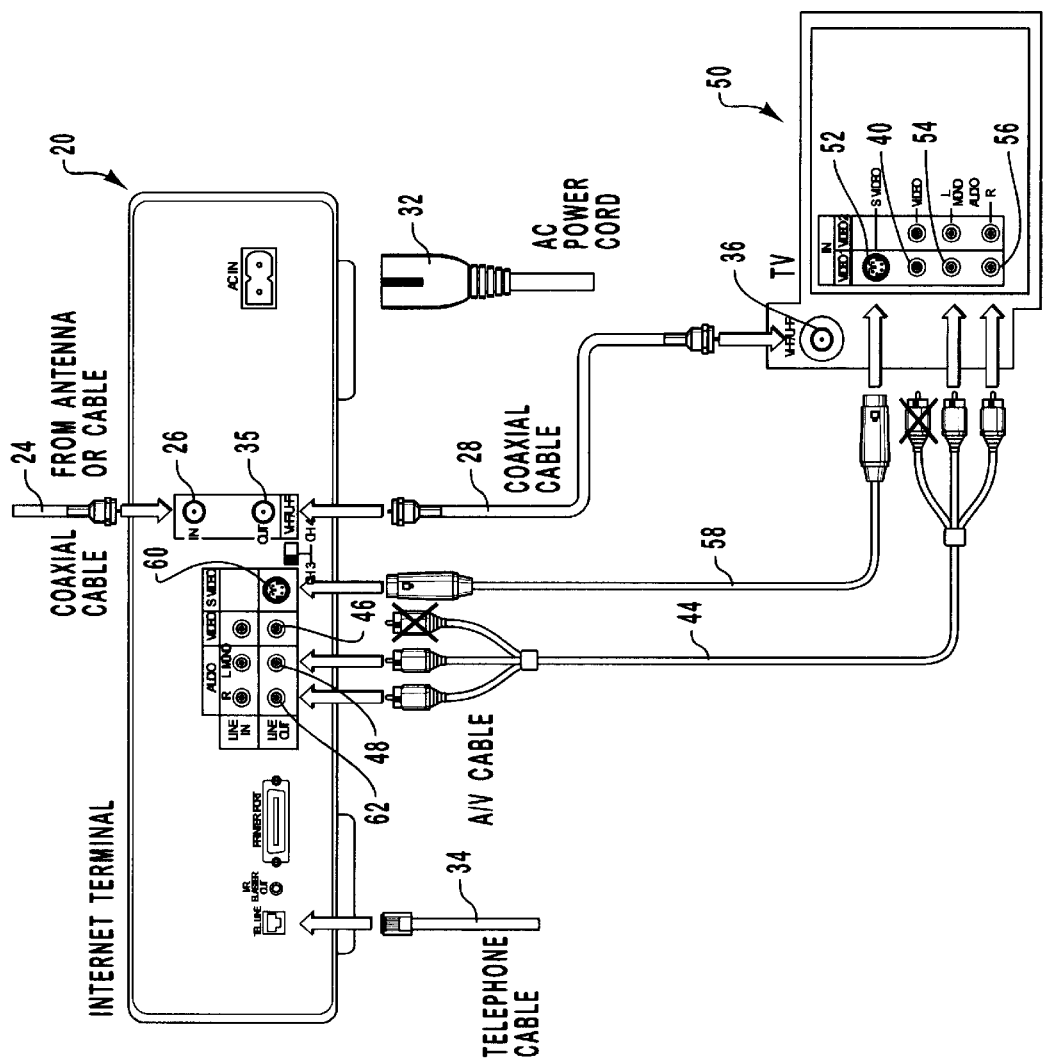
FIG. 3 illustrates connecting an Internet terminal to a television having both S-video inputs as well as line video and audio inputs.
Figure 4:
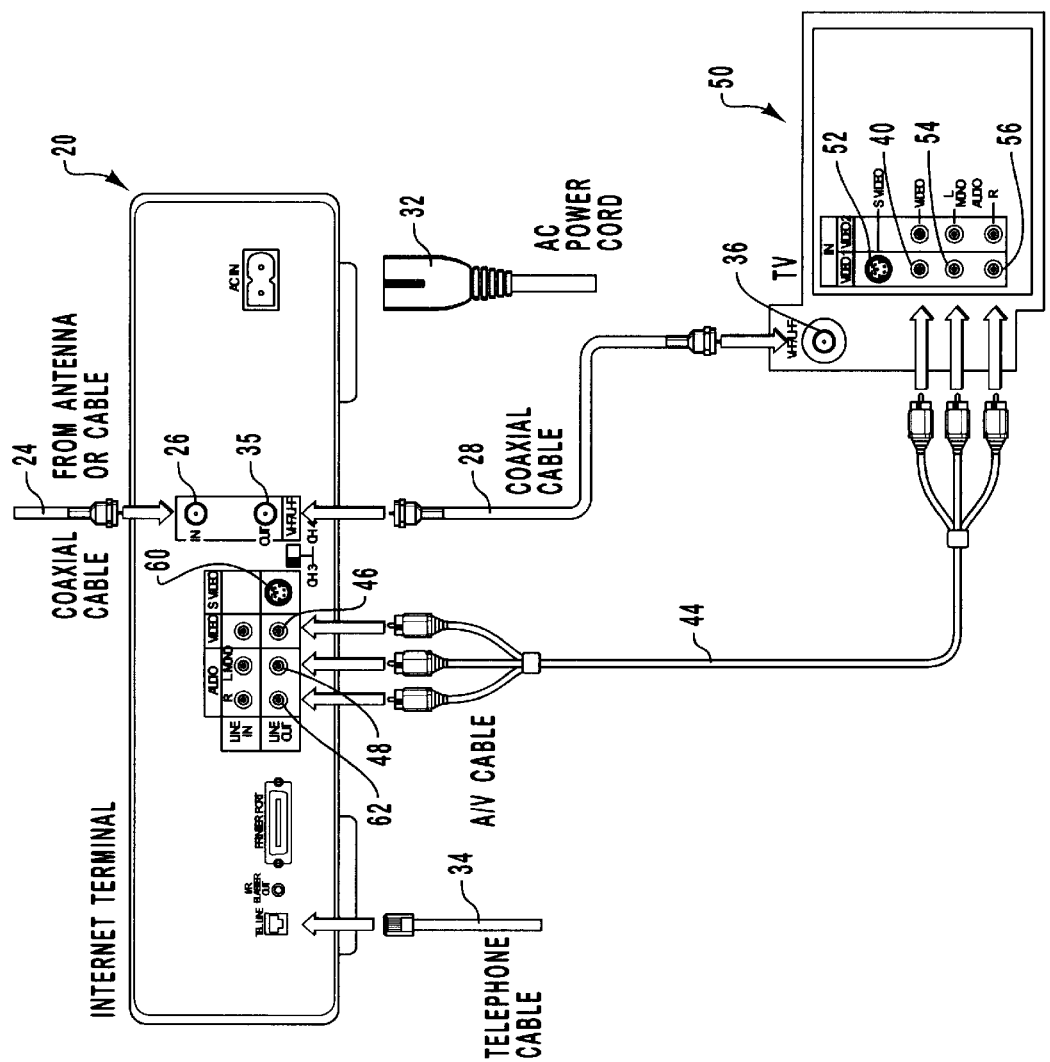
FIG. 4 is another example of connecting an Internet terminal to a television having S-video input as well as line video and audio inputs.

Referring to FIG. 7, a consumer electronics device according to the present invention is illustrated. In this context, consumer electronics device is used to refer to any number or type of various consumer electronics devices that can be connected to a television set. Such devices include, but are not limited to, cable boxes, satellite receivers, VCRs, video game machines, video disk players, home theater equipment, and Internet terminals. In the discussion below, the example of an Internet terminal will generally be used. However, those skilled in the art will recognize that the principles of the present invention may equally be applied to any other type of consumer electronics device.

In FIG. 7, a consumer electronics device, such as an Internet terminal, is illustrated generally as 98. In order that a plurality of consumer electronics devices may be interconnected, embodiments of the present invention may comprise a plurality of identical, interchangeable, connector means for connecting to a plurality of different cable types. These connector means will typically comprise a plurality of conductors or pins adapted to carry electrical signals. By way of example, and not limitation, in FIG. 7, the plurality of connector means are illustrated by tongue and groove connectors 100. A wide variety of various connectors may be employed for the connector means. Tongue and groove connectors are simply one example. The tongue and groove connectors, however, have certain characteristics that makes them particularly well suited for the present invention. For example, tongue and groove connectors are extremely inexpensive and are widely available. Such tongue and groove connectors are found on a plurality of different devices from PC card modems to video game machines. The tongue and groove connectors also have a plurality of pins that can be used to carry various types of electrical signals. As described in greater detail below, many cables which are connected to consumer electronics device 98 have a plurality of conductors designed to carry various types of signals. Providing connectors with a plurality of pins allows all signals to be carried through a single connector. Finally, the tongue and groove connectors come in a variety of sizes that are well suited to various embodiments of the present invention.

In the present invention, connectors 100 are identical in that a cable which connects to one connector will physically connect to any other connector as well. Thus, a single cable may be connected to any one of the identical connectors. The connectors of the present invention are also interchangeable in that any cable may be connected to any connector and function properly. This functionality may be provided in a number of various ways. The details of how this functionality may be provided are presented below. In summary, however, in one embodiment as a cable is plugged into a connector, the pins are reconfigured in order to be compatible with the cable and carry the appropriate signals.

Figure 5:
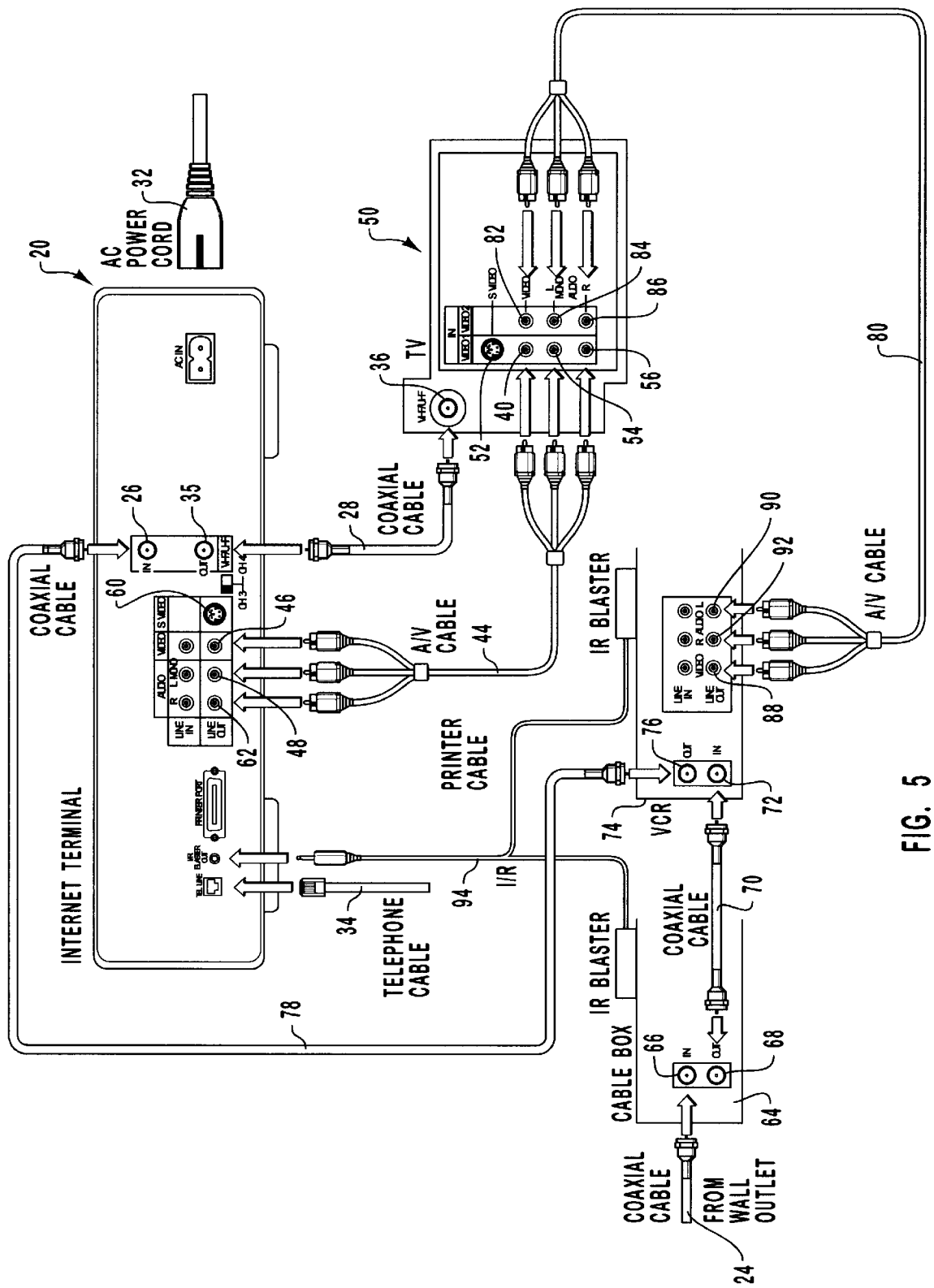
FIG. 5 illustrates connecting an Internet terminal, a cable box, and a VCR to a television.

By providing a plurality of identical interchangeable connectors on the back of the consumer electronics device, certain types of cabling errors are eliminated. For example, in the configurations illustrated in FIGS. 1–5, cabling errors often occur when a user interconnects the wrong connectors. For example, referring to FIG. 5, it can be extremely easy to interchange the RCA jacks of cable 44 so that they are misconnected and do not connect to the proper connectors of Internet terminal 20. In order to reduce such cabling errors, RCA cables, such as cable 44, often attempt to color code the connectors at either end the Internet terminal. However, it is still possible to interchange them. In addition, many errors occur when a user connects to the input connectors rather than the output connectors. By providing a single connector on the back of the consumer electronics device with a plurality of pins that can carry appropriate electrical signals, any such cabling errors are eliminated. Furthermore, by providing a plurality of identical, interchangeable connectors, users do not have to identify which connector goes to which consumer electronics device. The advantage of this feature will become more apparent in the discussions below.

In addition to connectors 100, consumer electronics device 98 also has input connector 102 which is a standard RF coaxial connector that is connected to an antenna or the cable which comes directly from the cable television provider. Connection to cable boxes and/or satellite receivers will be covered below. Consumer electronics device 98 also has power connector 104 to connect to a power cable. If consumer electronics device 98 is an Internet terminal, then consumer electronics device 98 may also be provided with telephone connector 106 to connect to a telephone line and printer port 108 to connect to a printer.

Although the embodiment illustrated in FIG. 7 has six tongue and groove connectors, as will be illustrated below, the number of tongue and groove connectors need only be sufficient to connect to the number of consumer electronics devices that a user desires. For example, if a user desires to only connect to a cable box and VCR, then only three tongue and groove connectors may need to be provided (one connector is required to connect to the television set). If a consumer has a wide variety of consumer electronics devices, such as a satellite receiver, a cable box, a video game machine, a video disk player, a VCR, and so forth, then more connectors are required.

FIGS. 8A–13 illustrate various types of cables which can connect various types of consumer electronics devices to a device configured according to the present invention. From this point on, consumer electronics device 98 will be presumed to be an Internet terminal simply to simplify the notation and discussion below. However, as previously discussed, those skilled in the art will recognize these principles can be applied to any type of consumer electronics device.

Referring first to FIG. 8A, a cable is shown that connects to a television having video and audio line inputs. In FIG. 8A, television 110 has video input 112, left channel audio input 114, and right channel audio input 116. Television 110 also has VHF/UHF connector 118. Cable 120 is specifically adapted to connect to television 110. Thus, cable 120 is provided with a conspicuous label 122 indicating that the cable is for attaching a television to the Internet terminal. In FIG. 8A, label 122 is provided on connector 124. Connector 124 is adapted to attach to any of the identical, interchangeable connectors on the Internet terminal, such as connectors 100 of FIG. 7. The other end of cable 120 is provided with a plurality of connectors, each adapted to attach to the appropriate television connector. For example, connector 126 is adapted to connect to connector 118, connector 128 is adapted to connect to connector 112, connector 130 is adapted to connect to connector 114, and connector 132 to connector 116.

Because the cable is specifically adapted to attach to a particular type of television set having a defined set of connectors, each connector on the cable can be conspicuously labeled. For example, connector 126 may be conspicuously labeled with the legend "to VHF/UHF" or a similar legend which clearly indicates that connector 126 is to be attached to connector 118. The remaining connectors may also be similarly labeled. Note that such labeling prevents yet another type of cabling error that sometimes occurs. Referring back to FIG. 5, in order to appropriately attach Internet terminal 20 to television 50 via RCA cable 44, a user must specifically identify that the output connectors of Internet terminal 20 are connected to the input connectors of television 50. In other words, the connectors on the Internet terminal are labeled differently than the connectors on the television. This provides yet another source of confusion for many consumers who do not fully understand the concept of signals flowing out of one device and into another. The cable in FIG. 8A prevents such cabling errors first by having the connector that attaches to the Internet terminal be a universal connector that requires no thought to be connected and may be plugged into any one of the identical, interchangeable connectors provided on the Internet terminal. The other end of the cable is clearly labeled so that a user can readily identify which connector on the television they connect to.

As previously illustrated in conjunction with FIGS. 1–5, not all televisions have the identical connectors on the back. FIG. 8B shows another possible television connector arrangement. In FIG. 8B, television 134 is provided with video input 112, left channel audio input 114, right channel audio input 116, and VHF/UHF connector 118. In addition, television 134 is provided with S-video input 136. Cable 138 is thus provided with connectors to connect to S-video input 136, left channel audio 114, right channel audio 116, and VHF/UHF connector 118. The other end of cable 138 is provided with connector 124 adapted to connect to any of the identical, interchangeable connectors of the Internet terminal. In the cable illustrated in FIG. 8B, there is no need to connect both to S-video input 136 and video input 112. Thus, cable 138 is only provided with a connector to connect to S-video input 136. As with cable 120 of FIG. 8A, all connectors that connect to television 134 may be appropriately labeled in order to reduce cabling errors.

Figure 8D:
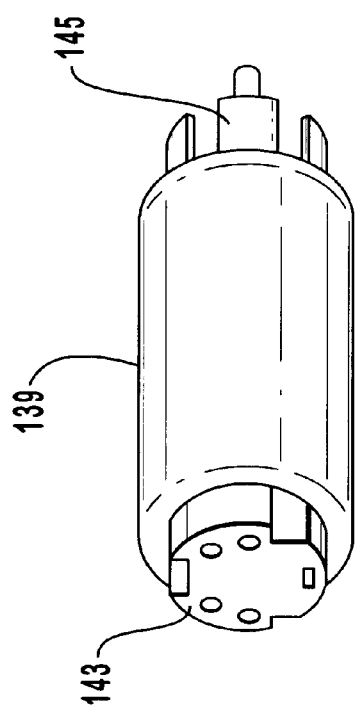
FIGS. 8C and 8D illustrate a cable and an associated adapter that allows the cable to be used with S-video and RCA television formats.
Figure 8C:
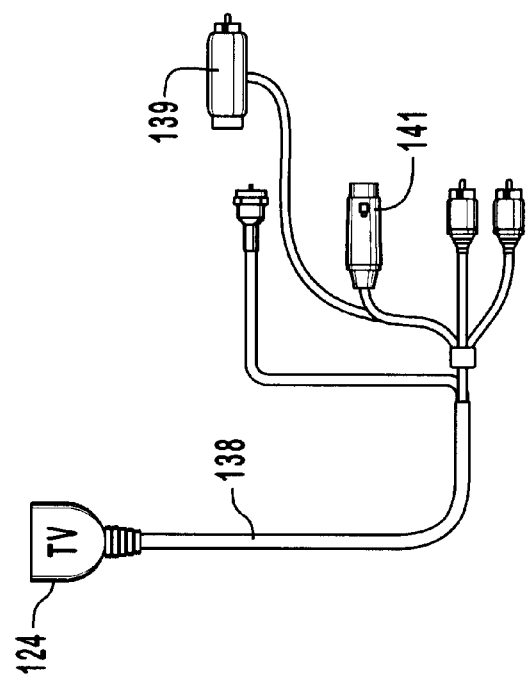

FIG. 8C shows an embodiment of a cable that is compatible with both S-video and RCA video formats. Cable 138 of FIG. 8B is supplemented with an S-video-to-RCA video adapter 139, illustrated in FIGS. 8C and 8D, that allows cable 138 to be used with televisions having either format, thereby reducing the number of cable types that must be supplied or made available. Adapter 139 can be conveniently tethered to cable 138 so that the adapter is not lost when it is not being used. When the television to be connected does not have an S-video connector, or when the user desires to use the RCA video input, adapter 139 is coupled to the end of connector 141. Adapter 139 has a female S-video socket 143 that mates with the male S-video pins of connector 141. At its other end, adapter 139 has a male RCA video coupler 145. When cable 138 is instead to be used with an S-video format television, adapter 139 remains unconnected to connector 141. In this case, connector 141 is coupled with the corresponding S-video connector of the television.

In order for the Internet terminal to properly configure the pins of the interchangeable connector, the Internet terminal, in one embodiment, includes means for sensing which of a plurality of different cable types have been connected. For instance, the means for sensing may determine whether cable 138 is being used with the S-video or RCA format. One possible method of determining whether cable 138 is being used with the S-video or RCA format involves sensing the value of a resistor included in adapter 139. Specifically, adapter 139 can be associated with a specified resistor value between one of its conductors and ground. Accordingly, the means for sensing detects a different resistor value when the adapter is being used than when it is not being used. In response to the detected resistor value, the Internet terminal appropriately configures the pins of the interchangeable connector so that the correct signals are sent over cable 138.

Figure 8E:
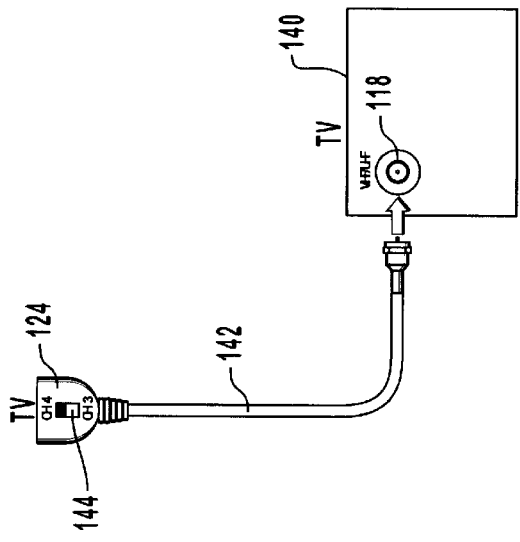
FIG. 8E shows another cable adapted to one type of television.

FIG. 8E illustrates television 140 which has only a VHF/UHF connector 118. Such a television represents, for example, older legacy sets that are still functional but lack many of the modern hardware and circuitry provided in today's televisions. In such a situation, a special cable 142 is specifically adapted to connect only to the VHF/UHF connector. As with the other cables, one end is provided with connector 124 adapted to connect to any of the identical, interchangeable connectors on the Internet terminal. In this situation, however, connector 124 also has switch 144 which allows a user to select an unused channel for the information provided by the Internet terminal. The circuitry for placing the information on the appropriate channel may be incorporated into connector 124, may be incorporated into the Internet terminal itself. In the latter case, the Internet terminal may sense the position of switch 144 and configure itself to provide information on the appropriate channel. Such configuration may involve remembering which channel the Internet information should be supplied on or may require reconfiguration of the connector pins associated with one of the identical, interchangeable connectors.

Other televisions may exist which have slightly different connector arrangements from those shown in FIGS. 8A–8E. However, given the teachings of FIGS. 8A–8E, appropriately configured cables can be supplied. For example, if a television does not have stereo audio inputs, but only a mono audio input, then a cable may be provided that has only one audio connector instead of two.

Figure 9B:
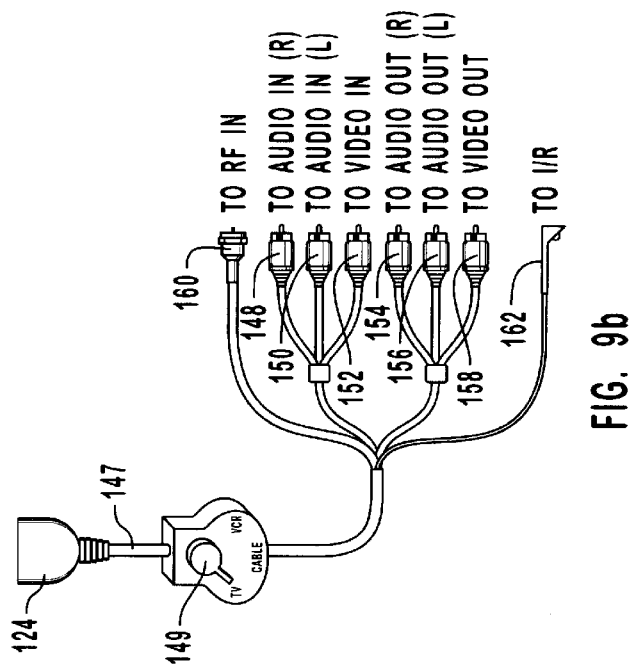
FIG. 9B illustrates a cable having a dial and a switching mechanism that allow the cable to be used with any of multiple consumer electronics devices.
Figure 9A:
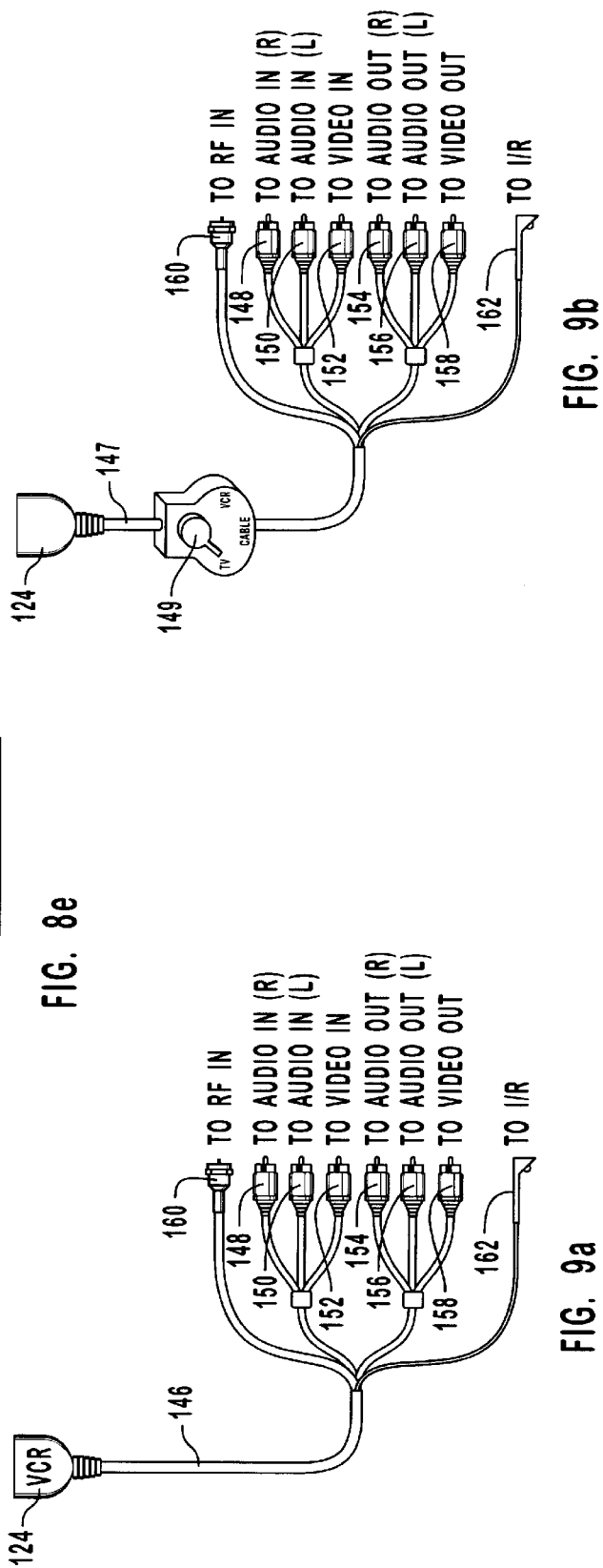
FIG. 9A illustrates a cable to connect to a VCR.

FIG. 9A illustrates a cable specifically adapted to attach to one type of VCR. The cable as shown in FIG. 9A illustrates the various connectors that may be required with a VCR. An examination of the back of a typical VCR reveals that the VCR has not only audio and video line inputs, but also audio and video line outputs. Thus, cable 146 is provided with connectors 148, 150, and 152 to connect to the appropriate line inputs, and connectors 154, 156, and 158 to connect to the appropriate line outputs. In addition, it may be desirable to supply VHF/UHF connector 160 to connect to the VHF/UHF input connector of the VCR. In this situation there is no need to connect to the VHF/UHF output connector of the VCR since such connectors are typically provided so that a daisy chain of consumer electronics devices can be made. The present invention replaces the daisy chain arrangement with a hub and spoke type arrangement with the RF input coming into the center hub. There is, therefore, no need to connect to the RF outputs of any consumer electronics device. As explained below, the RF input comes into the center of the hub and then commonly connects to all appropriate RF inputs of the consumer electronics devices.

Figure 6:
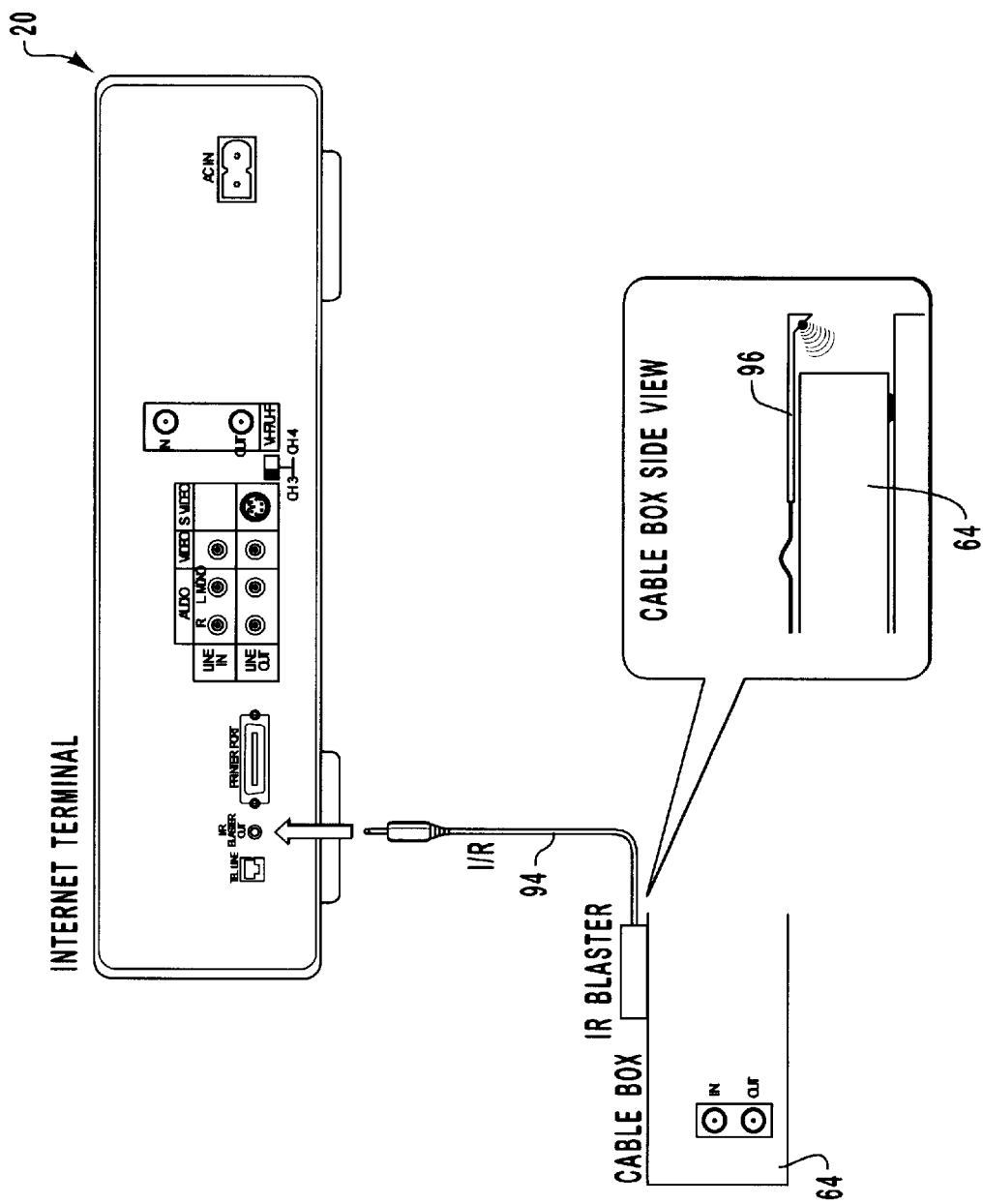
FIG. 6 illustrates connecting the IR cable from an Internet terminal to another consumer electronics device.

Returning now to FIG. 9A, cable 146 is also provided with IR connector 162. IR connector 162 may be in the form of an IR emitter device such as IR emitter assembly 96 of FIG. 6. It is anticipated that the Internet terminal will incorporate an IR receiver to receive commands from a remote control. Rather than requiring the user to use a separate remote to operate the VCR, the Internet terminal can relay the commands to the VCR using IR connector 162. By providing IR connectors to each consumer electronics device with an IR receiver, each consumer electronics device may be controlled by a single remote. The other end of cable 146 is provided with an appropriately labeled connector 124.

FIG. 9B illustrates an embodiment of a cable that includes an optional feature that simplifies the hardware needed to connect a variety of consumer electronics devices to an Internet terminal or to another consumer electronics device. In particular, with the selection of the position of a dial 149 or some other switching mechanism, cable 147 may be configured to connect one of two or more types of consumer electronics devices to an Internet terminal.

In the example illustrated in FIG. 9B, cable 147 has at one end a connector 124 adapted to connect to any of the identical, interchangeable connectors of the Internet terminal. At the other end, cable 147 includes connectors 148, 150, and 152 to connect to the appropriate line inputs of the consumer electronics device with which the cable is used and connectors 154, 156, and 158 to connect to the appropriate line outputs, if any, of the consumer electronics device. In addition, cable 147 includes RF connector 160 to supply VHF/UHF signals to the consumer electronics device. Cable 147 also includes IR connector 162, which may be in the form of an IR emitter device such as IR emitter assembly 96 of FIG. 6. It is noted that the foregoing connectors 148, 150, 152, 154, 156, 158, 160, and 162 may be the same as the corresponding connectors described in reference to FIG. 9A.

Cable 147 further includes means for selecting the conductor configuration of the cable such that the cable may connect the Internet terminal with any one of two or more other consumer electronics devices. One example of such means is dial 149, which may be manipulated by the user in order to indicate what consumer electronics device is to be connected to the Internet terminal. Alternatively, the means for selecting the conductor configuration may be any switch for establishing connectivity over selected conductors in the cable.

It is noted that cable 147 includes the types of connectors that correspond to the input connectors of a television, a VCR, and a cable box, among other possible consumer electronics devices. Specifically, connectors 152, 150, 148, and 160 of cable 147 can be coupled with input connectors 112, 114, 116, and 118 of television 110 of FIG. 8A. Connectors 154, 156, 158, and 160 can be coupled to the corresponding connectors of a cable box. As described above in reference to FIG. 9A, connectors 148, 150, 152, 154, 156, 158, 160, and 162 can be coupled with the corresponding connectors of a VCR.

Dial 149 controls a switching mechanism within cable 147 that selects conductors in the cable to transmit signals between connector 124 and the particular connectors at the other end of the cable that are to be coupled to the consumer electronics device. For example, dial 149 may have three positions, one for each of the television, cable box, and VCR with which cable 147 may be used. Dial 149 can be conspicuously labeled to indicate the available dial settings and to inform the user that the cable is compatible with various consumer electronics devices. When cable 147 is to be used, for instance, with a television, the dial is set to the television position. The switching mechanism within cable 147 establishes connectivity across the appropriate conductors, thereby configuring the cable to be used with the television. In this example, the switching mechanism can also establish connectivity across the appropriate conductors for cable boxes and VCRs when the dial is turned to the corresponding settings. Of course, in other embodiments, cables equipped with the dial or another example of the means for selecting the cable configuration can be compatible with multiple consumer electronics devices other than or in addition to the television, cable box, and VCR specifically described in reference to FIG. 9B.

This optional feature of the invention provides the advantage of reducing the number of cable types that must be obtained to connect a variety of consumer electronics devices to the Internet terminal. For many users, this can further simplify the task of connecting multiple consumer electronics devices in a home entertainment or information retrieval system.

Figure 10B:
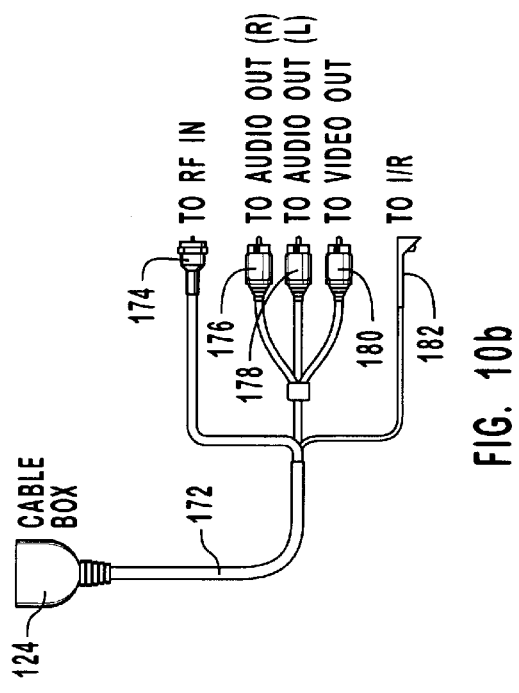
FIGS. 10A and 10B represent cables to connect to various cable boxes.
Figure 10A:
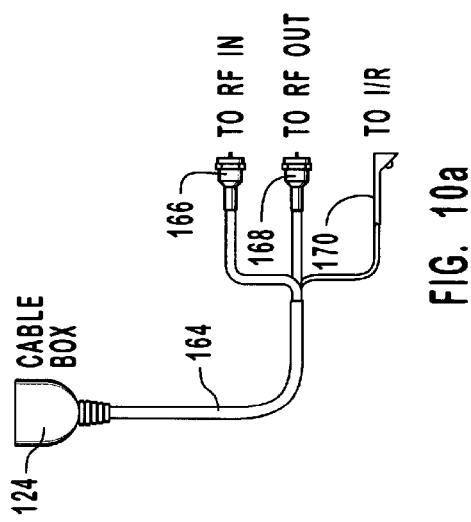

FIGS. 10A and 10B illustrate two exemplary cables which can connect the Internet terminal to a cable box. Referring first to FIG. 10A, cable 164 has at one end an appropriately labeled connector 124 adapted to connect to any of the identical, interchangeable connectors of the Internet terminal. Cable 164 is adapted to attach to a cable box that has an RF input and RF output connector. In addition, most cable boxes use a remote control to tune the cable box to the appropriate channel. Thus, cable 164 has connector 166 to attach to the RF input, connector 168 to attach to the RF output, and IR connector 170 to transmit IR signals to the cable box in order to change the channel of the cable box or access other functions of the cable box via the remote control of the Internet terminal. IR connector 170 may be an IR emitter assembly such as that illustrated by IR emitter assembly 96 of FIG. 6.

Because some and, occasionally, all of the channels provided by a cable company are scrambled, it may be desirable to provide both an RF input and RF output to a cable box. In this manner, the cable box can be used to descramble any scrambled channels. Thus, when the cable box is tuned to a scrambled channel using IR connector 170 or other means, the RF output connector 168 will carry the appropriate descrambled channel, which may then be routed to the appropriate destination, as directed by the user. As an alternative, the descrambling circuitry may be incorporated into the Internet terminal. By employing suitable methods to prevent piracy so that only those channels which a user is legally entitled to receive are descrambled, it may not be necessary to use connector 168 or, perhaps, even employ a cable box.

Some more modem cable boxes provide audio and video line outputs. FIG. 10B illustrates a cable adapted to attach to such a cable box. In FIG. 10B cable 172 is provided with an appropriately labeled connector 124. On the other end, cable 172 is provided with connector 174 to be connected of the RF input of the cable box, connectors 176 and 178 to be connected to the right and left audio channel outputs of the cable box, connector 180 to be connected to the video output of the cable box, and IR connector 182. IR connector 182 may also be an IR emitter such as IR emitter 96 of FIG. 6.

Figure 11:
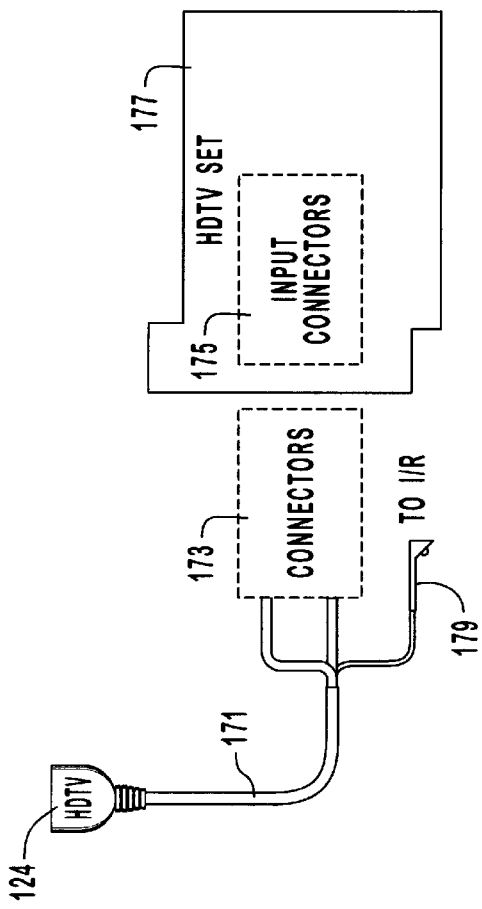
FIG. 11 depicts a cable to connect to a high definition television.

FIG. 11 illustrates a cable adapted to connect to a high definition television (HDTV) set. The specific structures of the connectors of the cable that connect to the HDTV set will depend largely on the HDTV standard or standards that will emerge over the coming years. The currently proposed video scanning formats for HDTV include 480P, 720P, and 1080I, where the numerical component indicates the number of vertical lines, while "P" indicates progressive scanning and "I" indicates interlaced scanning. Those skilled in the art, upon learning of the disclosure made herein, will understand how to configure cable 171 to these or any other HDTV format.

In principle, cable 171 performs many of the same functions as the other cables disclosed herein. For example, cable 171 is provided with appropriately labeled connector 124 which attaches to any of the identical, interchangeable connectors of the Internet terminal. On the other end, cable 171 is provided with connectors 173 to connect to the video and audio input connectors 175 of HDTV set 177. Cable 171 may also be provided with provided with IR connector 179, which may be an IR emitter such as IR emitter 96 of FIG. 6.

Turning next to FIG. 12, a cable adapted to connect a satellite receiver to the Internet terminal is illustrated. Cable 184 is provided with appropriately labeled connector 124 which attaches to any of the identical, interchangeable connectors of the Internet terminal. On the other end, the cable is provided with S-video connector 186 to connect to the S-video output of the receiver. Cable 184 is also provided with connector 188 and 190 to connect to the right and left audio channel outputs of the receiver, respectively. Finally, cable 184 is provided with IR connector 192, which may be an IR emitter such as IR emitter 96 of FIG. 6.

Recently, a new standard for interconnecting various types of consumer electronics devices has been proposed. This new standard is the IEEE 1394 standard. The standard is also sometimes referred to as FireWire, I-link, and Lynx. The IEEE 1394 standard supports a serial bus type structure that allows data transfer rates of up to 400 Mbps. Although it is anticipated that consumer electronics devices will soon begin appearing with IEEE 1394 connectors, a tremendous amount of legacy hardware currently exists and it is anticipated for the foreseeable future, consumer electronics devices adhering to the IEEE 1394 standard will also come configured with traditional connectors such as those illustrated in FIGS. 1–5. Thus, it is unclear at this point how quickly the IEEE 1394 standard will be adopted widespread enough to realize the benefits of the standard. It would, therefore, be important to be able to provide a mechanism to allow IEEE 1394 devices to coexist with legacy systems that do not adhere to the IEEE 1394 standard. The present invention can dramatically aid in the transition phase. As the IEEE 1394 devices become available, a user wishing to take advantage of the standard simply purchases a cable adapted to connect to the IEEE 1394 connector. Such an embodiment is illustrated in FIG. 13. In FIG. 13, cable 194 has on one end an appropriately labeled connector 124. On the other end, cable 194 has connector 196 which is adapted to connect to an IEEE 1394 connector. Operation of this cable is identical to the others in that connector 124 is adapted to be connected to any of the identical, interchangeable connectors on the Internet terminal. By using this mechanism, IEEE 1394 devices may be connected into devices using legacy systems that do not adhere to the IEEE 1394 standard. Thus, the present invention provides a convenient migration path from legacy systems to the IEEE 1394 standard. Such an approach also obviates the need to include legacy connectors on the consumer electronics devices that adhere to the IEEE 1394 standard.

The cables illustrated in FIGS. 8A–13 are representative of the various cables that may be developed according to the present invention. However the illustrated cables should not be construed to be limiting of the scope of the invention. In essence, for any particular device a cable can be constructed that has on one end a connector to connect to the identical, interchangeable connectors to the device. For example, in Europe, many television sets conform to the SCART standard with its particular connectors and signals. A cable that is compatible with a SCART television would have a SCART connector on one end and a connector 124 on the other.

Figure 14:
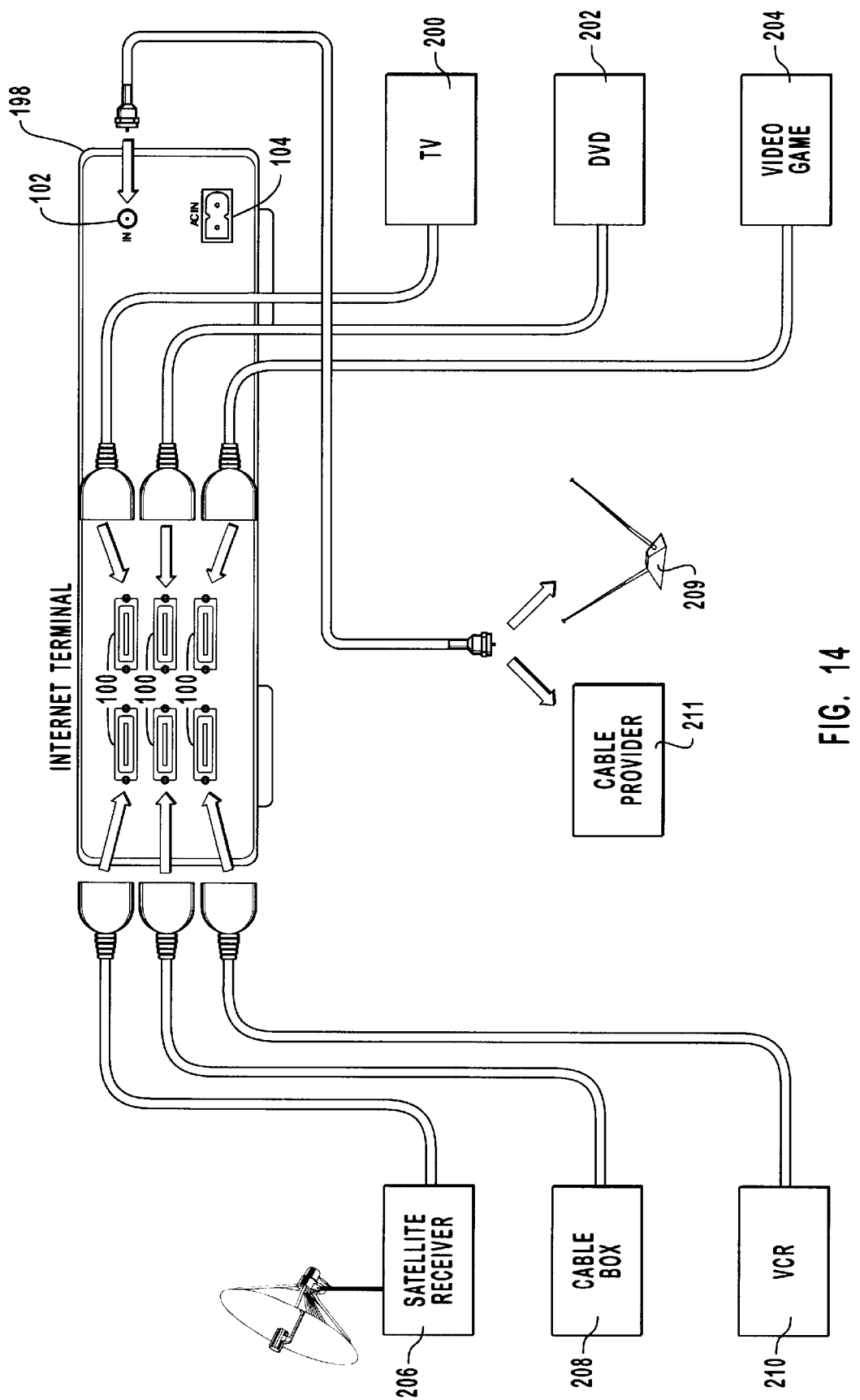
FIG. 14 illustrates a plurality of consumer electronics devices connected to a consumer electronics device according to the present invention.

Turning next to FIG. 14, an overview of the architecture of the Internet terminal connected to a plurality of consumer electronics devices is illustrated. FIG. 14 illustrates Internet terminal 198 as forming a central hub for the various consumer electronics devices. As previously discussed, the consumer electronics devices may comprise a wide variety of devices. As representative consumer electronics devices, FIG. 14 illustrates television 200, video disk player 202, video game machine 204, satellite receiver 206, cable box 208, and VCR 210. All of these consumer electronics devices are connected to one of the plurality of identical, interchangeable connectors 100 of Internet terminal 198. Each consumer electronics device will use an appropriate cable, such as those illustrated in FIGS. 8A–13.

By connecting each consumer electronics device to the Internet terminal, a dramatic simplification of the cabling, both physically and electrically, can be realized. As previously described, the input signal from an antenna 209 or cable system 211 is connected to input connector 102 of the Internet terminal. As more fully illustrated below, such an input signal may be commonly connected on one of the plurality of pins of each of the identical, interchangeable connectors 100. In this way, the input video signal can be directed to any particular consumer electronics device that requires it without the need to daisy chain the input signal through a variety of consumer electronics devices. For example, in FIG. 14 the input video signal supplied to connector 102 may also be commonly supplied to television 200, cable box 208, and VCR 210. Each of these devices thus may receive the input signal without daisy chaining the input signal through the various consumer electronics devices. In addition, the number of cables used to connect the various consumer electronics devices has been dramatically reduced. Each device still receives the number of conductors required to fully take advantage of its features, but the number of cables required is reduced. Furthermore, because a consumer does not need to determine which connector to plug a particular cable into on the Internet terminal, a dramatic simplification of the connection is realized.

FIG. 14 illustrates another benefit of the present invention. Because each consumer electronics device is connected to the Internet terminal in a hub and spoke arrangement, adding changing or removing consumer electronics devices is very easy. To remove a device, the cable is simply disconnected from the Internet terminal. No other changes to existing cables or consumer electronics devices need to be made. When a device is added, the cable for the device is connected to the Internet terminal. No other changes need to be made. This contrasts with current systems, such as that illustrated in FIG. 5 which would require significant changes to the existing configuration if, for example, the VCR was removed.

Because the cable from any consumer electronics device may be plugged into any one of the identical, interchangeable connectors of the Internet terminal, mechanisms must be put in place to ensure that the appropriate signals are directed to the appropriate consumer electronics device. This may be accomplished in a variety of ways. For example, if a sufficient number of connector pins exist, each of the connectors may be configured so as to provide various signals on various pins such that when a particular cable is connected to the connector, the electrical connections are made only to those signals necessary for that particular consumer electronics device. As yet another example, some configuration of the connector pins may occur when a cable is attached to the connector. In this method, when a cable is attached to the connector, the system senses the particular type of cable that has been attached and configures the pins on the connector to carry the appropriate signals for that particular cable. In such an embodiment, the system would to have means for sensing which of a plurality of different cable types have been connected and means for selecting the electrical signals carried on at least one of a plurality of pins in order to match the electrical signals with the particular cable type attached to the connector. An overall conceptual diagram of such an approach is illustrated in FIG. 15.

Figure 15:
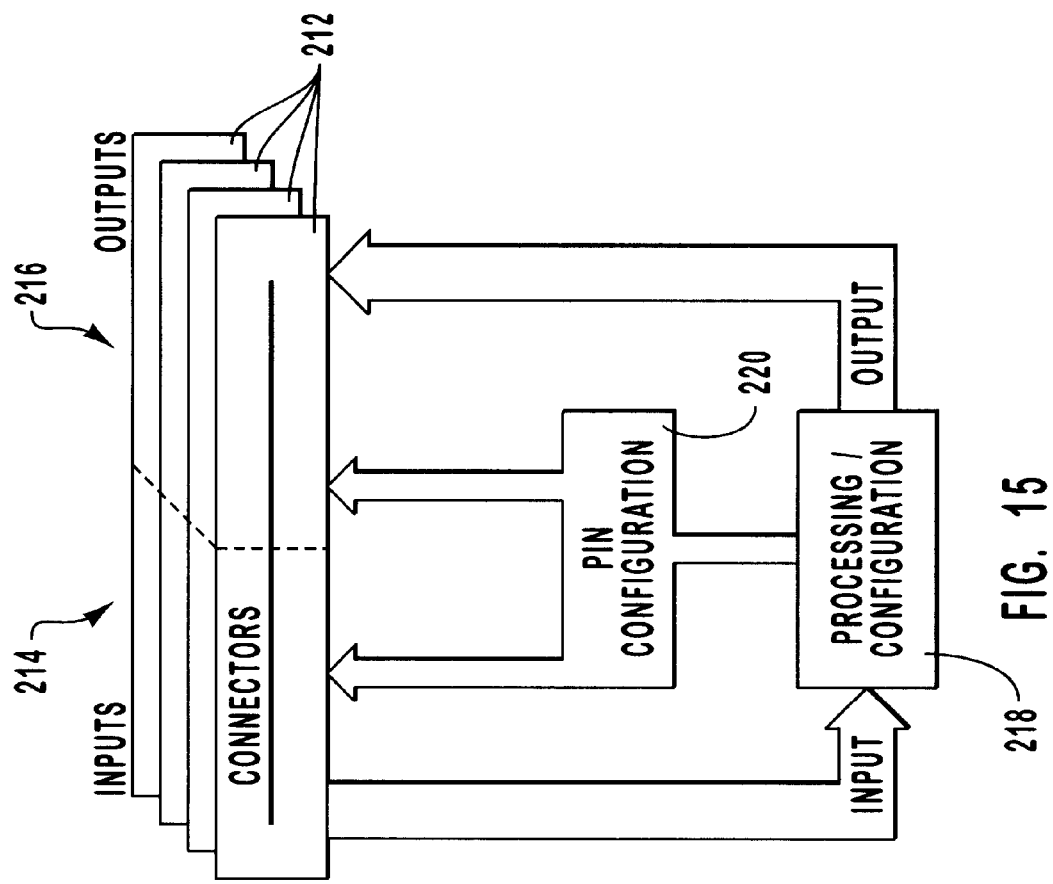
FIG. 15 represents a high-level diagram illustrating the process of configuring pins of the connector according to the present invention.

In FIG. 15, a plurality of identical, interchangeable connectors 212 have been illustrated. Each connector 212 has a plurality of pins adapted to conduct electrical signals. In FIG. 15, the pins have been divided into input pins 214 and output pins 216. Input pins are those designed to carry signals into the Internet terminal or other consumer electronics devices constructed according to the present invention, and output pins are those designed to carry output signals to the attached consumer electronics device. Note that not all consumer electronics devices will have both input and output signals that need to be supplied. This can be identified, for example, by examining the various cable types illustrated in FIGS. 8A–13. However, since certain devices have both inputs and outputs, the system must be configured with both input and output capability.

When a cable is attached to a particular connector, the system will sense the particular cable type connected. Thus, in FIG. 15 processing and configuration block 218 may contain means for sensing which of a plurality of different cable types have been connected. Such means for sensing may comprise a wide variety of structures that perform the function. For example, each cable may be provided with a particular resistor value attached between one of the connector pins and ground that is sensed by processing/configuration block 218 and, based on the value of the resistor, the particular type of cable can be identified. As an alternative, various mechanisms exist where a plurality of wires may be connected between various pins in the cable and ground. Then, depending on the particular cable type, the cable will be manufactured with a certain wiring pattern in order to create a series of pins that are either open or are connected to ground. By reading this code, the particular cable type may be identified. As yet another example, a small amount of memory containing an identification code may be placed on the cable. This information may then be transferred via a serial or parallel connection to processing/configuration block 218 where the particular cable is identified. As yet another example, when a cable is connected to a particular consumer electronics device, it may be possible for processing/configuration block 218 to send and receive signals via the cable to interrogate the consumer electronics device in order to ascertain the particular type of consumer electronics device and, by inference, the particular cable that has been attached to the connector. For example, this would be done if 1394 were used. Other mechanisms may also be used for the means for sensing the plurality of different cable types. All that is necessary is that processing/configuration block 218 be able to identify the particular type of cable attached to a particular connector.

Once the particular cable type has been identified, the system then configures the pins of the connector in order to carry the appropriate electrical signals. Thus, embodiments of the present invention may comprise means for selecting the electrical signals carried on at least one of the plurality of pins in order to match the electrical signals with the particular cable type attached to the connector. In FIG. 15 such means for selecting is illustrated by pin configuration block 220. As illustrated in FIG. 15, both input and output pins may be configured by pin configuration block 220. In some embodiments, however, it may be sufficient to configure either the input or the output and not both. The pins that need to be configured will depend on the particular implementation. A example implementation that configures pins is presented in greater detail below. The particular mechanism used to configure the output pins by selecting the various signals that are carried thereto may comprise a variety of mechanisms. For example, various switching mechanisms may be employed to selectively place various signals on a particular pin. As yet another example, hardware that originates the signal may be configured to originate the proper signal. Other mechanisms may also be utilized and any mechanism which allows the proper signal to be carried to or from the proper pin.

Figure 16:
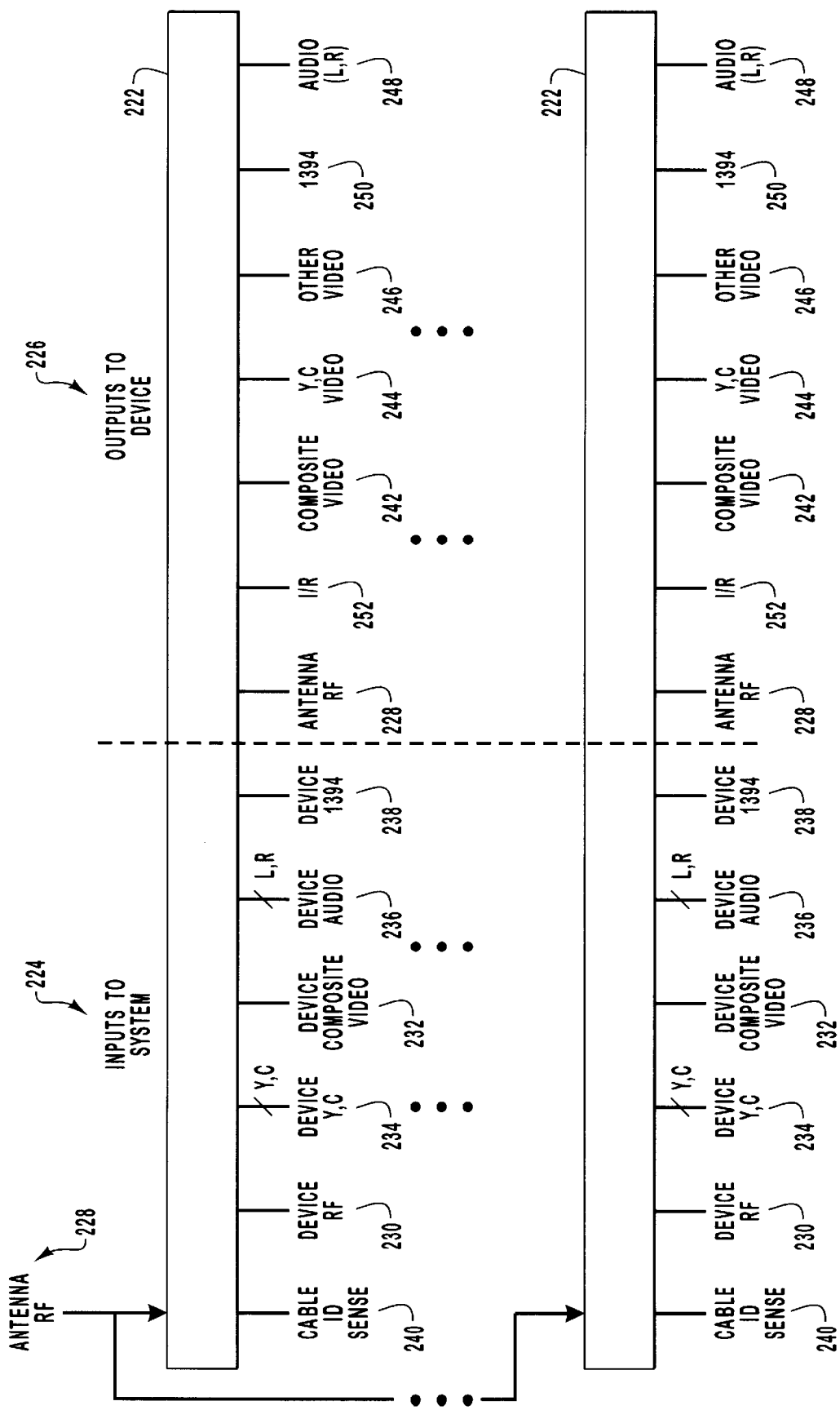
FIG. 16 represents a plurality of identical, interchangeable connectors according to the present invention.

One particular device where the present invention may be particularly useful is an Internet terminal, such as that supplied by WebTV Networks, Inc. An examination of the various types of consumer electronics devices that may be connected to the Internet terminal and an evaluation of the various inputs and outputs has yielded the embodiment illustrated in FIG. 16. FIG. 16 is a conceptual diagram that illustrates the various inputs and outputs that may occur according to one particular embodiment of the present invention. The diagram of FIG. 16 makes no attempt to identify the particular pins of a connector that may be used to carry the various signals. It simply describes all the various types of signals that may either be input or output.

In FIG. 16, a plurality of identical, interchangeable connectors 222 are illustrated. Input signals are shown generally as 224 and output signals are illustrated generally as 226. One input signal is antenna RF 228, which represents any RF input signal that is connected, for example, to input connector 102 of FIG. 14. Basically, antenna RF 228 will come from either a particular antenna system, such as a traditional VHF/UHF antenna or from a cable television provider. As indicated in FIG. 16, one particular embodiment of the present invention ensures that the input RF signal is commonly connected between each of the identical, interchangeable connectors. As previously described, this allows the RF signal to be provided directly to any particular consumer electronics device that may require it. This configuration eliminates the daisy chain process that is used by traditional cabling methods. Various devices may also provide an input RF signals to the system. This is illustrated in FIG. 16 by device RF signal 230. Such may occur, for example, when a cable box or other device provides descrambled information via standard RF signals. As previously discussed in conjunction with FIG. 10A, RF energy may be supplied to a cable box which then descrambles the appropriate channel and provides the information back to the system via a coax cable. Such a signal would be input into the system by device RF signal 230.

In addition to video and audio information carried on an RF signal, various devices may input video and audio information in a variety of formats. For example, video information may be provided in a standard composite video signal or in a video signal that has the chroma and luma separate such as an S-video signal. In FIG. 16, other video which may be provided to the system is illustrated by device composite video 232 and device Y,C video 234. Device composite video 232 may represent composite video in any number of various formats, one example being the standard composite video signal utilized in the United States. As another example, one of the video standards common in Europe or other parts of the world may also be utilized. Device Y,C video 234 represents a video signal where the chroma and luma are provided separately, as for example an S-video or other high definition standard. Although not specifically illustrated in FIG. 16, various other standards may also be utilized, as for example the standard proposed for high definition television or advanced television.

Audio information that may be provided by a consumer electronics device is illustrated by device audio signal 236. Device audio signal 236 represents any of the audio information provided by a particular consumer electronics device. Although stereo and audio is illustrated in FIG. 16, such audio information may include surround stereo, mono or other audio signals, depending on the particular device.

As previously mentioned, one embodiment of the present invention contemplates that devices conforming to the IEEE 1394 standard may also be connected thereto. Thus, in FIG. 16 device IEEE 1394 signals 238 represent the information provided to the system via the 1394 standard. The 1394 standard currently comprises a six-conductor cable. Two pairs of conductors are dedicated to a data and strobe line in each direction (e.g. input and output) while the remaining two conductors are a power and ground conductor, respectively. Device 1394 signal 238 represents those conductors necessary to transfer data into the system and includes, as a minimum, the data and strobe lines used to provide information into the system.

FIG. 16 also illustrates cable ID sense signal 240. This signal represents any number of specific signals required to sense the ID of the cable connected to the connector. If the system uses, for example, a resistor value that is sensed to identify the cable, then cable ID sense signal 240 may represent but a single conductor. If, on the other hand, the ID of the cable is sensed using one of the other mechanisms previously described then cable ID sense signal 240 may represent a plurality of conductors.

Referring next to outputs provided to various devices 226, we can see that antenna RF signal 228 may be provided to the various devices, as previously described. Furthermore, various video signals such as composite video 242, Y,C video 244, or other video 246 may be provided. These signals represent various formats of video that may be provided to a particular type of consumer electronics device. For example, composite video 242 may represent the composite video signal typically employed in the United States or other country. Y,C video 244 may represent video signals that have the chroma and luma information separate, as for example S-video or other such signal. Other video 246 may represent a wide variety of other types of video signals commonly employed, as for example RBG video typically provided to computer monitors, high definition video signals used in high definition television, or any of the other formats that may be employed by various consumer electronics devices in the United States or another country.

Audio information may be supplied to various consumer electronics devices as indicated by audio signal 248. Although stereo audio is illustrated in FIG. 16, audio signal 248 may also provide mono audio or any of the various surround sound audio signals typically employed.

For devices which conform to the IEEE 1394 standard, data may be supplied by 1394 signals 250. These signals include, as a minimum, the data and strobe signals used to provide information to various devices using the IEEE 1394 standard. Device outputs 226 also includes IR signal 252. IR signal 252 represents, for example, the IR information that may be supplied to various consumer electronics devices to control operation thereof through an infrared receiver. As previously mentioned, and as is commonly known, various consumer electronics devices may be controlled through various remote controls which provide IR information to an IR receiver located on the consumer electronics device. As previously illustrated in conjunction with FIG. 6, and as disclosed in the various cables presented in FIGS. 8A–13, the cables may be provided with an IR emitter assembly which can be used to provide IR information directly to the IR receiver of the consumer electronics device. IR signal 252 illustrates that such IR information may be provided as an output on the connectors. As explained below, IR signal need not be actual IR energy, but may be an electrical signal that is provided to an emitter assembly on the cable that converts the electrical signal to an infrared signal.

Figure 17:
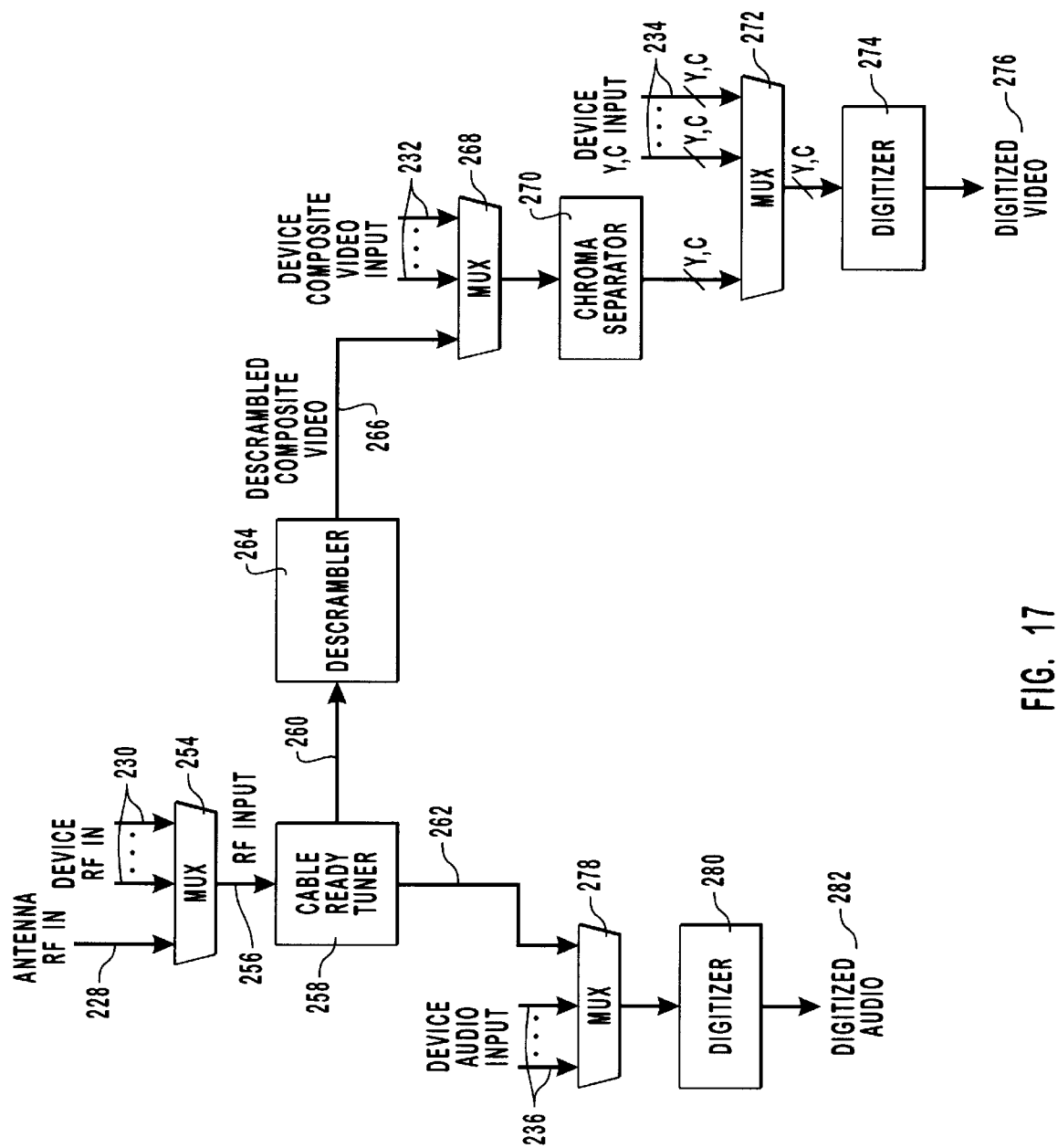
FIG. 17 represents how the input pins of the connectors are connected to an internal video processor according to the present invention.

Because of the wide variety of signals that may be supplied to or output from a device configured according to the present invention, various mechanisms must be employed to receive information in a variety of formats and to provide information in a variety of other formats to the output. In one embodiment of the present invention represented by an Internet terminal provided by WebTV Networks, Inc., all video processing is incorporated into a single processing chip referred to as the SOLO chip. The SOLO chip may receive information in a wide variety of video formats and translate received video to a wide variety of other video formats. The information provided to the SOLO chip is first digitized and then processed and converted to the appropriate format by the SOLO chip. In other embodiments of the present invention which do not incorporate the SOLO chip, it is anticipated that, as a minimum, the various input signals may need to be selected and digitized for further processing. One embodiment of various circuitry that may be used to digitize audio and video information is illustrated in FIG. 17.

As previously discussed, and as illustrated in FIG. 16, RF signals may be provided to the Internet terminal, or other consumer electronics device configured according to the present invention, from a variety of sources. In FIG. 17, the sources are illustrated by antenna RF 228 and device RF 230. MUX 254 is used to select one of the plurality of RF inputs that are of interest at a particular point in time. Selected RF input 256 is then provided to cable ready tuner 258. Tuner 258 separates the information in the RF signal into composite video signal 260 and audio signals 262.

If the selected video signal is scrambled, then composite video 260 may be provided to descrambler 264 which can descramble the information and yield descrambled composite video signal 266. If composite video signal 260 is not scrambled, then the signal need not be passed through descrambler 264.

Once composite video signal 266 (or 260 if the signal is not scrambled) is produced, the composite video signal is simply one of any number of any composite video signals that may be produced by various devices. The composite video signals produced by the various devices are illustrated by composite video signals 232. MUX 268 may be provided to select a composite video signal of interest. The composite video signal may then be passed through chroma separator 270 in order to produce separate chroma and luma signals. The separate chroma and luma signals are then another of the various chroma and luma signals that may be provided by the devices as illustrated by device Y,C input 234. A particular Y,C pair may be selected by MUX 272 and digitized by digitizer 274 to produce digitized video 276. As illustrated in FIG. 17, by selecting the proper signals at Mux 254, 268, and/or 272 digitized video 276 may represent a digitized version of any video information input through the system either through and RF input, a composite video input, or a separate chroma luma signal.

Audio information may be similarly digitized. In FIG. 17, the audio information 262 separated out from an input RF signal may be provided to the input of MUX 278 along with device audio inputs 236 in order to select the audio signal corresponding to the selected video signal. The audio signal may then be digitized by digitizer 280 to produce digitized audio 282. Thus, the circuitry illustrated in FIG. 17 may be used to select desired video and audio information from any particular consumer electronics device and digitize the video and audio for further processing and display on a display device such as a monitor or television set.

As illustrated in FIGS. 16 and 17, the various consumer electronics devices that may be connected to the Internet terminal may provide video and audio information in a variety of formats. However, as previously discussed in conjunction with FIGS. 8A–8E, the display device connected to the Internet terminal may only accept information in a limited number of formats. Thus, a conversion process may need to occur to convert information from one video or audio format to another video or audio format. Embodiments within the scope of this invention may therefore comprise video processors or other processors which may perform these conversions. Such conversion is particularly useful for systems which are marketed internationally and may have to deal not only with the video formats available in the United States, but also the video formats that are available throughout the world. The embodiment illustrated in FIG. 18 illustrates one mechanism whereby the digitized video and audio may be provided to a video processor that is capable of performing such conversions, as well as a variety of other functions which will be discussed below.

Figure 18:
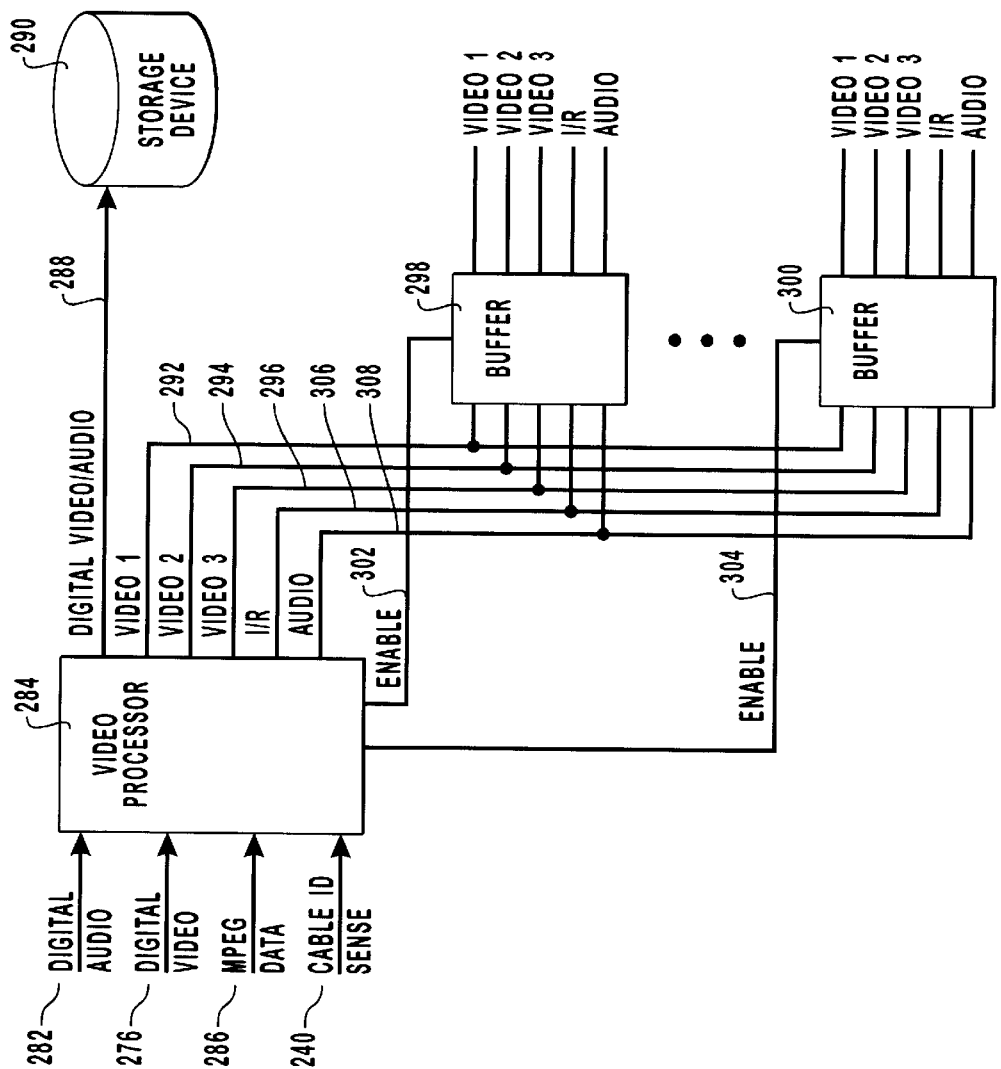
FIG. 18 illustrates how a video processor is connected to the output pins of the connectors.

In FIG. 18, video processor 284 represents the circuitry necessary to process video and audio information in the manner sufficient to achieve the desired goals of the system. For example, a system which is marketed solely within the United States only need deal with those video and audio standards which are common to the United States. For example, video processor 284 may be configured to convert information that is received by the device to a composite video output, a signal with separate chromo and luma information, or, perhaps, one of the emerging high definition television standard formats. On the other hand, a system that is marketed in Europe and other locations may also be configured to convert received digital and audio information into the formats common to Europe similar considerations are necessary for systems marketed in various other countries. Since audio information may be provided in a variety of formats including mono, stereo, as well as any of the surround sound type formats commonly available, conversion of audio data may also occur. In such a situation, video processor 284 may also be configured to provide the audio information in a desired format.

In the embodiment illustrated in FIG. 18, video processor 284 is illustrated as having digital audio input 282, digital video input 276, as well as MPEG data input 286. Digital audio 282 and digital video 276 may represent, for example, the digitized video and audio information from the circuitry of FIG. 17. MPEG data 286 not only represents NPEG data, but may also represent information that is provided in any other type of format that is already digitized. The designation of MPEG data should not, therefore, be construed as limiting the scope of the present invention. In addition, video processor 284 has cable ID sense signal 240. Cable ID sense signal 240 represents the signal provided in order to identify the cable to which the video and audio information will be output. The cable ID sense signal thus identifies the type of output information that must be generated to provide the proper signals to the appropriate connector pins. Thus, video processor 284 may incorporate means for sensing which of a plurality of different cable types have been connected to the connector means and means for selecting the electrical signals carried on at least one of the plurality of pins in order to match the electrical signals with the particular cable type attached to the connector. In one embodiment, video processor 284 may represent the SOLO chip, previously described, along with various other support and processing circuitry necessary to provide the functions described herein.

In one embodiment of the present invention, it is envisioned that the video and audio information provided to video processor 284 may be saved for later viewing or listening. Thus, video processor 284 may provide digital and audio information 288 to storage device 290 for storage and later retrieval and playback. Storage device 290 may be any type of storage device commonly used in either the consumer electronics or computer industries. Digital video and audio information 288 may be provided in any format suitable to the embodiment of the particular invention, as for example MPEG or other digital format. Occasionally, it will be desirable to match the video and audio format of 288 to the particular storage device used. Thus, if storage device 290 is a digital video tape, then it may be desirable to provide the information in a format compatible with the digital video tape. In the alternative, another format may also be used that is not traditionally associated with the particular storage device, as for example digital audio and video information being recorded on an analog VCR.

As illustrated in FIG. 18, video processor 284 may have a plurality of video outputs such as video outputs 292, 294, and 296. These video outputs illustrate the signals that may be necessary to provide the appropriate video information in the appropriate format. Certain video formats, as for example composite video, only require a single video signal. Other video formats, as for example the RGB format typically used by many computer monitors require three signals. In one embodiment, video processor 284 is designed to utilize video signals 292, 294, and 296 to provide the various types of video formats according to the following table:

| Signal | Mode 1 | Mode 2 | Mode 3 |
| --- | --- | --- | --- |
| Video 1 | Y | R | Y |
| Video 2 | C | G | $C_R$ |
| Video 3 | Composite | B | $C_B$ |

The combinations illustrated in the above table represent, for example, the capabilities of one embodiment of the SOLO chip, previously discussed. In the table, the various modes of the chip are illustrated. Thus, in one mode the video chip can simultaneously provide a composite video signal and separate chroma and luma information that is used, for example, in an S-video signal. In another mode, the chip provides the outputs necessary for a computer monitor operated according to one of the many RGB formats. In yet another mode, the chip operates with separate chroma and luma information according to one of the high definition television formats. In the table, Y, $C_R$ and $C_B$ represent an emerging high definition television standard.

Not illustrated in the above table is the timing signals associated with the various modes. For example, in the RGB computer mode, video information may be provided in a 640×480 progressive scan VGA format or an 800×600 SVGA format. Similar considerations occur for the other modes of operation. For example, it is anticipated that embodiments within the present invention may be able to generate, using the above modes, any of the timing signals typically encountered in the United States or other countries of the world. For example, in Europe where televisions may conform to a SCART format, the RGB mode may be modified to provide appropriate video signals and a cable can be developed which has at one end the connector to connect to the Internet terminal and at the other end the standard SCART connectors, typically associated with devices using this format.

Returning now to FIG. 18, buffer 298 and buffer 300 represent a mechanism for placing the required output signals on the desired connectors. As indicated in FIG. 18, each buffer has an associated enable signal, 302 and 304 respectively. These allow video processor 284 to place the required signals on the desired output pins. Those skilled in the art will recognize that this concept may be extended to any number of input and/or output signals so that the appropriate signals may be individually enabled or may be enabled as a group.

FIG. 18 also illustrates that IR signal 306 and audio signal 308 may also be generated by video processor 284. As previously discussed, IR signal 306 represents infrared information that can be transmitted to an appropriate infrared receiver of an appropriate device. At this point in the circuitry, however, IR signal 306 may not be an actual infrared signal. At this point, the signal may be electrical which may then be transmitted through the electrical conductors of the connector and converted into an appropriate IR signal on the cable itself, or, in the alternative, in the infrared emitter assembly. Such an approach eliminates the necessity of providing a special infrared transmission mechanism across the connector. Audio signal 308 is representative of the desired audio signals and may include mono audio signals, stereo audio signals, or the appropriate signals to drive any of the surround sound type devices commonly available.

Although signals such as the IEEE 1394 signals are not illustrated in FIG. 18, they may also be generated by video processor 284 and transmitted through buffers 298 and 300. In the alternative, special 1394 circuitry may generate the required signals and video processor 284 may simply enable the signals as appropriate based on cable ID sense signal 240.

Figure 19:
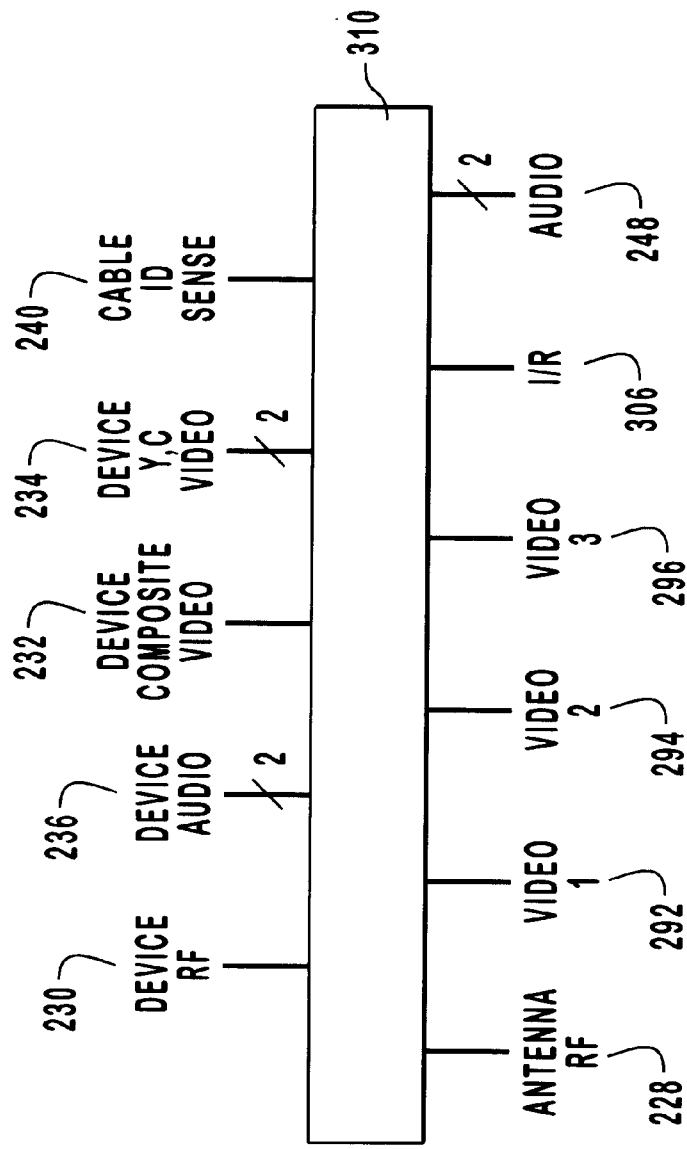
FIG. 19 represents an example connector according to the present invention.

FIG. 19 represents an example of the number of conductors required to implement the present invention in one embodiment. In FIG. 19, representative connector 310 is illustrated with input signals shown on the upper part of the connector and output signal shown on the lower part of the connector. As illustrated in FIG. 19, input signals include device RF 230, device audio 236, device composite video 232, device Y,C video 234, and cable ID sense 240. In this illustration, device audio 236 is assumed to have two channels (left and right) and device Y,C video has two conductors to transfer the chroma and luma separately. This embodiment includes a total of seven possible input conductors. In FIG. 19, the antenna RF is not illustrated as an input because the antenna RF would have a separate input connector, such as that illustrated in FIG. 14.

The output signals are illustrated as antenna RF 228, video outputs 292, 294, and 296, IR signal 306, and audio signal 248. Audio signal 248 is also illustrated as having two channels in this embodiment. Video signals 292, 294, and 296 may be used to transmit a variety of video signals, as illustrated in the table above. In the embodiment illustrated in FIG. 19, the IEEE 1394 signals are not explicitly shown. These signals may be provided on separate pins or, since IEEE 1394 may be used to transmit both audio and video information, the audio and video input and output pins may be configured to carry the appropriate signals.

As illustrated in FIG. 19, the total number of conductors for both input and output pins are only fourteen. Even assuming ground pins were placed between each of the active signal pins, that still only requires twenty-eight pins. The tongue and groove connectors currently available can place twenty-eight pins in a very small area. Thus, not only does the present invention reduce the complexity of interconnecting consumer electronics devices, it also replaces existing bulky connectors with relatively small, inexpensive tongue and groove connectors.

The present invention also realizes another cost savings. Since each hole that is made in the chassis of a consumer electronics device costs money, if the number of holes made in the consumer electronics device is reduced, then a savings may be realized. In the traditional cabling mechanisms, connectors had to be placed in the chassis for the myriad of differing devices and connection schemes that could potentially exist in any configuration. Thus, once the consumer electronics device is actually installed, a relatively few number of connectors may actually be used. In the present invention, however, any consumer electronics device may be attached to any of the identical, interchangeable connectors. Thus, the system only need contain a connector for each consumer electronics device that might potentially be connected. In other words, the factor that determines how many connectors are placed on a system is not the myriad of possible configurations that a system may be used in but, rather, the number of other consumer electronics devices that may need to be connected to the system. Many consumers have relatively few other consumer electronics devices. Thus, consumers may only have a television, a VCR, and, perhaps, a cable box. In the vast majority of the cases, then, three connectors will typically be sufficient. Upgraded systems having more connectors may also be produced and marketed to those individuals having a larger number of consumer electronics devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A consumer electronics device for use in a consumer electronics system that includes one or more other consumer electronic devices interconnected with cables, said consumer electronics device being adapted to be connected to the one or more other consumer electronics device using a designated cable, said consumer electronics device comprising:

a plurality of identical, interchangeable connector means for connecting to a plurality of different cable types, each connector means comprising a plurality of pins adapted to conduct electrical signals, wherein at least one of the plurality of pins is shared by each of the plurality of different cable types;

means for sensing which particular cable type of said plurality of different cable types have been connected to a given connector means; and means for dynamically configuring the at least one of said plurality of pins that is shared by each of the plurality of different cable types in order to match the electrical signals of the particular cable type attached to said given connector means.

2. A consumer electronics device as recited in claim 1 wherein said plurality of identical connector means comprises tongue and groove connectors.

3. A consumer electronics device as recited in claim 1 wherein said means for dynamically configuring configures only one or more output pins for said given connector means.

4. A consumer electronics device as recited in claim 1 wherein said means for dynamically configuring configures which type of video signals is output on one or more of said pins.

5. A consumer electronics device as recited in claim 1 wherein said consumer electronics device is an internet terminal device designed to provide access to the internet.

6. A consumer electronics device as recited in claim 1 further comprising a detachable cable adapted on one end to connect to any one of the identical connector means and further adapted on the other end to connect to a second consumer electronics device.

7. A consumer electronics device as recited in claim 6, wherein said detachable cable comprises means for selecting a conductor configuration of the detachable cable such that said detachable cable can connect said consumer electronic device with any one of two or more types of consumer electronics devices.

8. A consumer electronics device as recited in claim 6 wherein said given connector means comprise a tongue and groove connector and said cable connects to said tongue and groove connector on one end and said cable connects to an IEEE 1394 connector on the other end.

9. A consumer electronics device as recited in claim 6, further comprising a detachable adapter capable of being removably coupled to said other end of said detachable cable, said detachable adapter, when coupled to said other end, adapting said detachable cable from an S-video configuration to an RCA configuration.

10. A consumer electronics device as recited in claim 6 wherein said cable contains a resistor whose value can be sensed by said means for sensing in order to determine what type of cable has been connected to said given connector means.

11. A consumer electronics device as recited in claim 1 wherein said sensing means is adapted to sense a resistance value on one of said pins when a cable is attached to one of said connector means.

12. A consumer electronics device as recited in claim 1 wherein at least one of said plurality of pins is commonly connected between said plurality of connector means so that a common electrical signal resides on said commonly connected pins.

13. A consumer electronics device for use in a consumer electronics system that includes one or more other consumer electronics devices connected with cables, said consumer electronics device being adapted to be connected to the one or more other consumer electronics device using a designated cable, said consumer electronics device comprising:
   a plurality of identical connector means for connecting to a plurality of different cable types, each connector means comprising a plurality of pins adapted to conduct electrical signals, at least one of said plurality of pins being shared among the plurality of different cable types; and
   means for dynamically configuring the at least one shared pin to carry electrical signals appropriate for a particular cable type attached to a given connector means.

14. A consumer electronics device as recited in claim 13 wherein said means for dynamically configuring does not configure electrical signals for a particular connector means if a cable is attached to said particular connector means that has only input signals and receives no output signals.

15. A consumer electronics device as recited in claim 14 wherein said means for dynamically configuring only configures electrical signals to be carried on one or more output pins of said connector means.

16. A consumer electronics device as recited in claim 15 wherein said means for dynamically configuring configures which type of video signals are output on at least one of said pins.

17. A consumer electronics device as recited in claim 16, further comprising means for sensing which particular cable type of said plurality of different cable types have been connected to the given connector means.

18. A consumer electronics device as recited in claim 17 wherein said sensing means is adapted to sense a resistance value on one of said pins when a cable is attached to one of said connector means.

19. A consumer electronics device as recited in claim 18 wherein said plurality of identical connector means comprises tongue and groove connectors.

20. A consumer electronics device as recited in claim 13, wherein at least one of said plurality of pins is commonly connected between each of said plurality of connector means so that a common electrical signal resides on said commonly connected pins.

21. A consumer electronics device for use in a consumer electronics system that includes one or more other consumer electronics devices interconnected with cables, said consumer electronics device being adapted to be connected to the one or more other consumer electronics device using a designated cable, said consumer electronics device comprising:
   a plurality of identical connector means for connecting to a plurality of different cable types, each connector means comprising a plurality of pins adapted to conduct electrical signals, wherein at least one of said plurality of pins is shared by each of the plurality of different cable types, and wherein at least one of said plurality of pins is commonly connected between each of said plurality of connector means so that a common electrical signal resides on said commonly connected pins;
   means for determining which particular cable type of said plurality of different cable types have been connected to said plurality of connector means; and
   means for dynamically configuring the at least one shared pin to carry electrical signals for each particular cable type attached to said plurality of connector means.

22. A consumer electronics device as recited in claim 21 wherein said means for dynamically configuring does not configure pins for a particular connector means if a cable is attached to said particular connector means that has only input signals and receives no output signals.

23. A consumer electronics device as recited in claim 22 wherein said means for dynamically configuring only configures one or more output pins of a given connector means.

24. A consumer electronics device as recited in claim 23 wherein said means for dynamically configuring configures which type of video signals are output on at least one of said pins.

25. A consumer electronics device as recited in claim 24 wherein said sensing means is adapted to sense a resistance value on one of said pins when a cable is attached to one of said connector means.

26. A consumer electronics device as recited in claim 25 wherein said plurality of identical connector means comprises tongue and groove connectors.

27. A consumer electronics system comprising:
   a consumer electronics device comprising:
      a plurality of identical connectors adapted to connect to a plurality of different cable types, each connector comprising a plurality of pins adapted to conduct electrical signals, wherein at least one of the plurality of pins is shared by one or more of the different cable types, and wherein at least one of said plurality of pins being commonly connected between each of said plurality of connector means so that a common electrical signal resides on said commonly connected pins; and
      a configuration component that dynamically configures the at least one shared pin to carry electrical signals for a particular cable type attached to a given connector; and
   at least one cable comprising:
      a connector adapted to connect to any one of said plurality of identical connectors; and
      at least one conductor with an associated connector adapted to connect to at least one other consumer electronics device.

28. A consumer electronics system as recited in claim 27 wherein said consumer electronics device further comprises means for sensing which of said plurality of different cable types have been connected to said identical connectors.

29. A consumer electronics system as recited in claim 27 wherein said cable further comprises a resistor whose value identifies the cable type of said cable.

30. A consumer electronics system as recited in claim 27 wherein said cable further comprises a digital code whose value identifies the cable type of said cable.

31. A consumer electronics system as recited in claim 27 wherein said cable is adapted to connect to at least one of either a video display device, a VCR, a cable box, a satellite receiver, a DVD, a laser disk, or sound equipment.

32. A consumer electronics system as recited in claim 27 wherein said cable is an IEEE 1394 cable.

33. A consumer electronics system as recited in claim 27, wherein said cable further comprises a switching mechanism that selects one of two or more conductor configuration of said cable, each of said two or more conductor configurations allowing said cable to connect said consumer electronics system with one of two or more types of consumer electronics devices.

34. A method for interconnecting a consumer electronics device having one or more identical and interchangeable connectors that support a variety of different cable types and one or more other consumer electronics devices having one or more other connectors, wherein each of the one or more identical and interchangeable connectors comprises one or more pins, and wherein at least one pin is shared by different cable types, the method comprising a first consumer electronics device performing acts of:

sensing a cable type for a cable connected to a particular identical and interchangeable connector;

configuring at least one pin of the particular identical and interchangeable connector to carry electrical signals appropriate for the sensed cable type, wherein the at least one pin is shared by different cable types; and carrying electrical signals on the at least one configured pin that are appropriate for the sensed cable type.

35. A method as recited in claim 34, wherein the at least one pin of the particular identical and interchangeable connector is configured as an output pin for transmitting electrical signals.

36. A method as recited in claim 34, wherein the at least one pin of the particular identical and interchangeable connector is configured as an input pin for receiving electrical signals.

37. A method as recited in claim 34, wherein the electrical signals comprise a video signal.

38. A method as recited in claim 34, further comprising an act of simultaneous routing multiple signals from multiple source consumer electronic devices to multiple destination consumer electronic devices.

39. A method as recited in claim 34, wherein the cable connected to the particular identical and interchangeable connector comprises a resistor, the method further comprising an act of sensing the cable type by determining the value of the resistor.

40. A method as recited in claim 34, wherein the cable connected to the particular identical and interchangeable connector comprises a memory storing an identification code, the method further comprising an act of sensing the cable type by receiving the identification code from the memory.

41. A method as recited in claim 34, wherein the cable interconnects the first consumer electronics device to a second consumer electronics device, the method further comprising an act of sensing the cable type by interrogating the second consumer electronics device to determine the second consumer electronics device's type and thereby inferring the cable type.

42. A method as recited in claim 34, wherein the cable comprises a plurality of pins, one or more of which are either connected to ground or are open, the method further comprising an act of sensing the cable type by identifying a pattern of the one or more open or grounded pins that corresponds to the cable type.

* * * * *

UNITED STATES PATENT AND TRADEMARK OFFICE
CERTIFICATE OF CORRECTION

PATENT NO. : 6,530,085 B1  Page 1 of 1
DATED : March 4, 2003
INVENTOR(S) : Stephen G. Perlman It is certified that error appears in the above-identified patent and that said Letters Patent is hereby corrected as shown below:

Column 7,
Line 36, after "at either end" please insert -- so that a user can identify which cable connector attaches to which connector on the back of --

Column 12,
Line 41, after "also be provided with" please delete "provided with"

Column 14,
Line 40, before "have means for" please delete "to"

Column 15,
Line 41, after "implementation." please delete "A" and insert -- An --

Column 18,
Line 33, after "either through" please delete "and" and insert -- an --

Column 19,
Line 25, after "not only represents" please delete "NPEG" and insert -- MPEG --

Signed and Sealed this

Third Day of February, 2004

JON W. DUDAS
*Acting Director of the United States Patent and Trademark Office*